US012720086B2

(12) United States Patent
Kang et al.

(10) Patent No.: US 12,720,086 B2
(45) Date of Patent: Aug. 25, 2026

(54) METHOD AND APPARATUS FOR DECODER SIDE MOTION VECTOR LIST MODIFICATION IN INTER PREDICTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Jung Kyung Lee, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/766,140

(22) Filed: Jul. 8, 2024

(65) Prior Publication Data

US 2024/0364904 A1 Oct. 31, 2024

Related U.S. Application Data

(63) Continuation of application No. PCT/KR2022/021608, filed on Dec. 29, 2022.

(30) Foreign Application Priority Data

Jan. 10, 2022 (KR) ........................ 10-2022-0003247
Dec. 28, 2022 (KR) ........................ 10-2022-0187975

(51) Int. Cl.
*H04N 19/192* (2014.01)
*H04N 19/105* (2014.01)
(Continued)

(52) U.S. Cl.
CPC ......... *H04N 19/192* (2014.11); *H04N 19/105* (2014.11); *H04N 19/119* (2014.11); *H04N 19/159* (2014.11); *H04N 19/176* (2014.11)

(58) Field of Classification Search
CPC .. H04N 19/192; H04N 19/105; H04N 19/119; H04N 19/159; H04N 19/176
(Continued)

(56) References Cited

U.S. PATENT DOCUMENTS 10,757,442 B2 8/2020 Li
11,212,551 B2 12/2021 Chujoh
(Continued)

FOREIGN PATENT DOCUMENTS

KR 20210153548 A 12/2021
WO 2019139013 A1 7/2019

OTHER PUBLICATIONS

International Search Report and Written Opinion cited in corresponding international patent application No. PCT/KR2022/021608; Apr. 3, 2023; 9 pp.
(Continued)

*Primary Examiner* — Justin W Rider
(74) *Attorney, Agent, or Firm* — Lempia Summerfield Katz LLC

(57) ABSTRACT

A method is disclosed for modifying a decoder-side motion vector list in inter prediction. A video coding method and an apparatus use a template matching method or a bilateral matching (BM) method in a merge mode and an advanced motion vector prediction (AMVP) mode of inter prediction. The video coding method and the apparatus perform at least
(Continued)

| Merge Index | L0 | L1 |
|---|---|---|
| 0 | A0 | A1 |
| 1 | B0 | B1 |
| 2 | C0 | C1 |
| 3 | D0 | D1 |
| 4 | E0 | E1 |
| 5 | F0 | F1 |

Merging Candidate List

| GPM Merge Index | L0 or L1 |
|---|---|
| 0 | A0 |
| 1 | B1 |
| 2 | C0 |
| 3 | D1 |
| 4 | E0 |
| 5 | F1 |

GPM Candidate List one of adding, pruning, or reordering candidates with respect to a motion vector list at the decoder side.

18 Claims, 19 Drawing Sheets

(51) Int. Cl.
*H04N 19/119* (2014.01)
*H04N 19/159* (2014.01)
*H04N 19/176* (2014.01)

(58) Field of Classification Search
USPC .................................................... 375/240.02
See application file for complete search history.

(56) References Cited

U.S. PATENT DOCUMENTS 11,223,848 B2 1/2022 Xiu
11,671,589 B2* 6/2023 Li ........................ H04N 19/105 375/240.02
11,671,620 B2 6/2023 Chujoh
11,677,950 B2* 6/2023 Schwarz .............. H04N 19/136 375/240.02
11,683,489 B2* 6/2023 Chao .................... H04N 19/136 375/240.02
11,706,410 B2* 7/2023 Kalva ................. H03M 7/3071 375/240.02
11,722,675 B2* 8/2023 Wang ................... H04N 19/176 375/240.02
11,743,459 B2* 8/2023 Karczewicz ........... H04N 19/82 375/240.02
2009/0185619 A1* 7/2009 Taleb ................. H04N 21/2335 375/E7.011
2010/0329328 A1* 12/2010 Kontola ............. H04N 21/8456 375/E7.078
2011/0299593 A1* 12/2011 Pettersson ............ H04N 19/573 375/240.03
2019/0014342 A1 1/2019 Li
2020/0169753 A1 5/2020 Xiu
2021/0067798 A1 3/2021 Chujoh
2021/0392370 A1 12/2021 Lim
2022/0094973 A1 3/2022 Chujoh
2022/0417522 A1* 12/2022 Huang ................. H04N 19/513
2023/0089741 A1* 3/2023 Seregin .................. H04N 19/52 375/240.02
2023/0094825 A1* 3/2023 Zhang .................... H04N 19/52 375/240.02
2023/0099505 A1* 3/2023 Ray ...................... H04N 19/625 375/240.02
2023/0199188 A1* 6/2023 Schwarz ................ H04N 19/13 375/240.02
2023/0232006 A1* 7/2023 Dinu .................... H04N 19/593 375/240.02
2023/0254489 A1* 8/2023 Xu ......................... H04N 19/13 375/240.02
2023/0300365 A1 9/2023 Chujoh

OTHER PUBLICATIONS

Yao-Jen Chang et al., EE2: Tests of compression efficiency methods beyond VVC; Joint Video Experts Team (JVET) of ITU-T SG 16 WP 3 and ISO/IEC JTC 1/SC 29; Document: JVET-V0120-v1; Apr. 2021; pp. 1-30.

* cited by examiner

Weight Map for Luma 4 6 $P_1$
2 4 6
2 4 6
$P_2$ 2 4

Weight Map for Chroma

| Merge Index | L0 | L1 |
|---|---|---|
| 0 | A0 | A1 |
| 1 | B0 | B1 |
| 2 | C0 | C1 |
| 3 | D0 | D1 |
| 4 | E0 | E1 |
| 5 | F0 | F1 |

Merging Candidate List

| GPM Merge Index | L0 or L1 |
|---|---|
| 0 | A0 |
| 1 | B1 |
| 2 | C0 |
| 3 | D1 |
| 4 | E0 |
| 5 | F1 |

GPM Candidate List

METHOD AND APPARATUS FOR DECODER SIDE MOTION VECTOR LIST MODIFICATION IN INTER PREDICTION

CROSS-REFERENCE TO RELATED APPLICATIONS

This application is a continuation of International Application No. PCT/KR2022/021608 filed on Dec. 29, 2022, which claims priority to and the benefit of Korean Patent Application No. 10-2022-0003247 filed on Jan. 10, 2022, and Korean Patent Application No. 10-2022-0187975, filed on Dec. 28, 2022, the entire contents of each of which are incorporated herein by reference.

TECHNICAL FIELD

The present disclosure relates to a modification method for a decoder-side motion vector list in inter prediction.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. In particular, inter prediction needs to take into account efficient operation on a motion vector list to improve video coding efficiency and enhance video quality.

SUMMARY

The present disclosure seeks to provide a video coding method and an apparatus using a template matching method or a bilateral matching (BM) method in a merge mode and an advanced motion vector prediction (AMVP) mode of inter prediction. The video coding method and the apparatus perform at least one of adding, pruning or reordering candidates with respect to a motion vector list at a decoder side.

At least one aspect of the present disclosure provides a method performed by a video decoding device for inter-predicting a current block. The method includes decoding from a bitstream a candidate index that indicates one of multiple candidates in a candidate list, each candidate representing a motion vector pair in a bi-prediction. The method also includes generating the candidate list by using neighboring information of the current block. The method also includes modifying the candidate list based on multiple passes of multi-pass bilateral matching (MBM) and an MBM cost. Here, the multiple passes includes a first pass performing a search for a motion vector pair for the current block, a second pass performing a search for a motion vector pair for a subblock within the current block, and a third pass performing a search for a motion vector pair for a sub-sub-block of the subblock. Performing the search is based on the MBM cost that is dependent on a difference between two blocks indicated by the searched motion vector pair for each of the multiple passes. The method also includes extracting a motion vector pair of the current block from the modified candidate list by using the candidate index. The method also includes generating a prediction block of the current block by using the extracted motion vector pair.

Another aspect of the present disclosure provides a method performed by a video decoding device for inter-predicting a current block. The method includes generating a candidate list by using neighboring information of the current block. The method also includes determining a candidate index that indicates one of multiple candidates in the candidate list, each candidate representing a motion vector pair in a bi-prediction. The method also includes modifying the candidate list based on multiple passes of multi-pass bilateral matching (MBM) and an MBM cost. Here, the multiple passes includes a first pass performing a search for a motion vector pair for the current block, a second pass performing a search for a motion vector pair for a subblock within the current block, and a third pass performing a search for a motion vector pair for a sub-sub-block of the subblock. Performing the search is based on the MBM cost that is dependent on a difference between two blocks indicated by the searched motion vector pair for each of the multiple passes. The method also includes extracting a motion vector pair of the current block from the modified candidate list by using the candidate index. The method also includes generating a prediction block of the current block by using the extracted motion vector pair and encoding the candidate index.

Yet another aspect of the present disclosure provides a computer-readable recording medium storing a bitstream generated by a video encoding method. The video encoding method includes generating a candidate list by using neighboring information of a current block. The video encoding method also includes determining a candidate index that indicates one of multiple candidates in the candidate list, and each candidate represents a motion vector pair in a bi-prediction. The video encoding method also includes modifying the candidate list based on multiple passes of multi-pass bilateral matching (MBM) and an MBM cost. Here, the multiple passes have a first pass performing a search for a motion vector pair for the current block, a second pass performing a search for a motion vector pair for a subblock within the current block, and a third pass performing a search for a motion vector pair for a sub-sub-block of the subblock. Performing the search is based on the MBM cost that is dependent on a difference between two blocks indicated by the searched motion vector pair for each of the multiple passes. The video encoding method also includes extracting a motion vector pair of the current block from the modified candidate list by using the candidate index. The video encoding method also includes generating a prediction block of the current block by using the extracted motion vector pair and encoding the candidate index.

As described above, the present disclosure provides a video coding method and an apparatus using a template matching method or a bilateral matching (BM) method in a merge mode and an AMVP mode of inter prediction. The video coding method and the apparatus perform at least one of adding, pruning or reordering candidates with respect to a motion vector list at the decoder side. Thus, the video coding method and the apparatus improve video quality and increase video coding efficiency.

DETAILED DESCRIPTION

Figure 1:
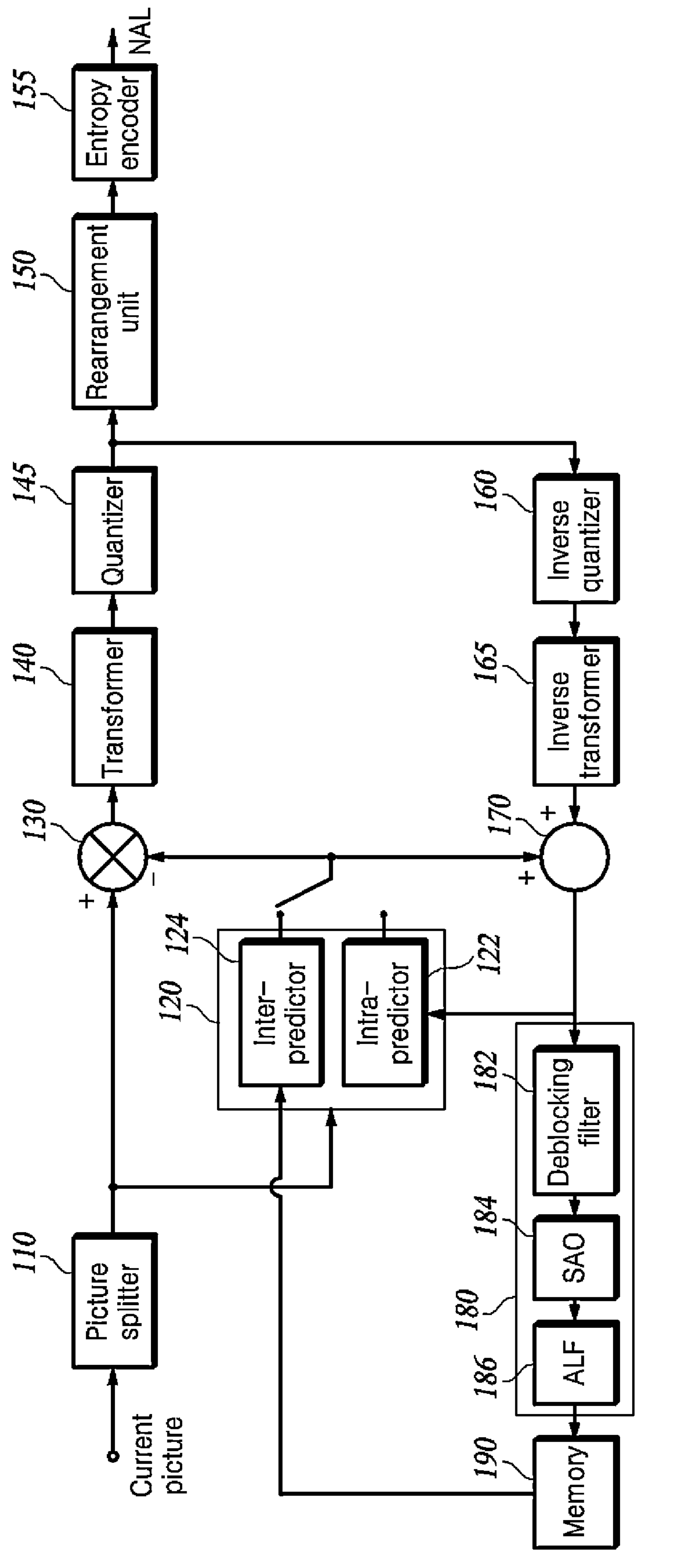
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
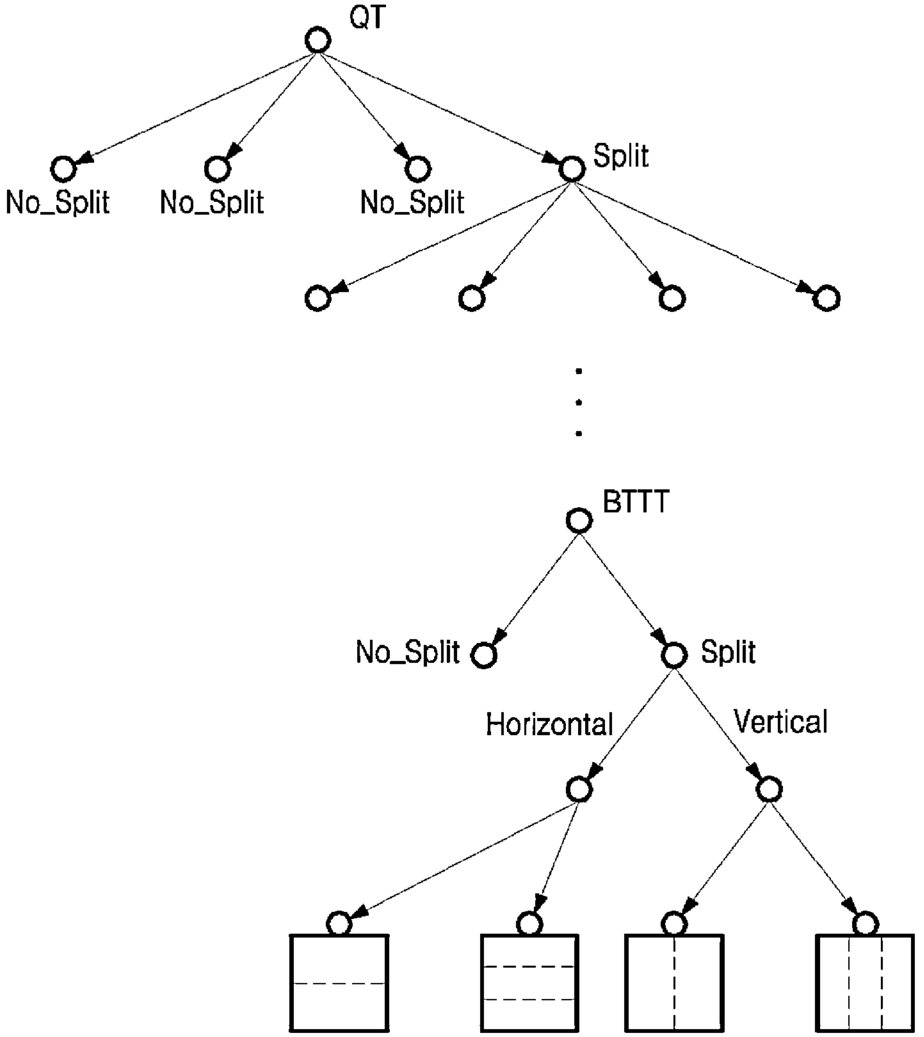
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
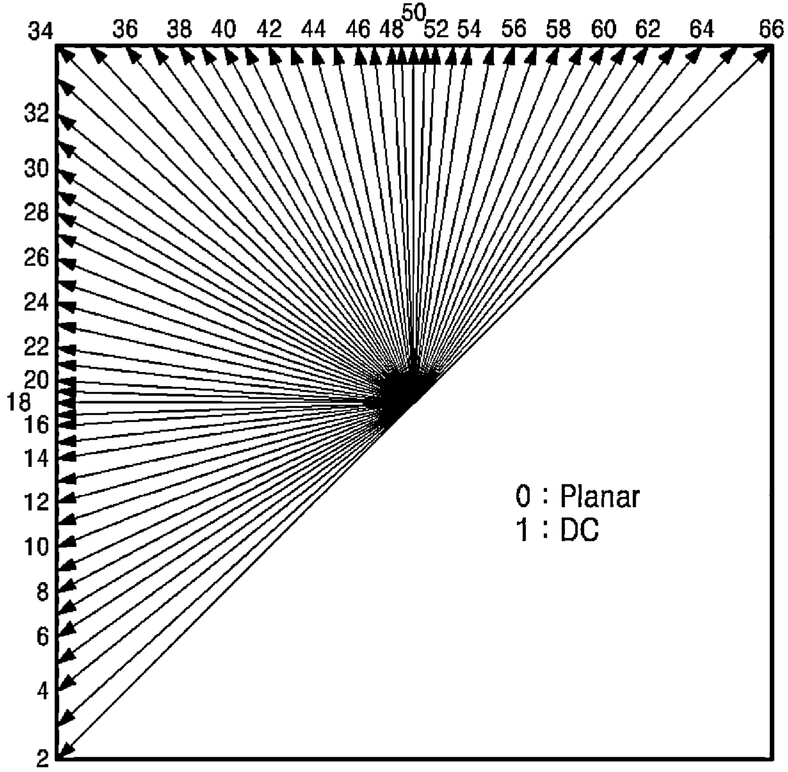
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
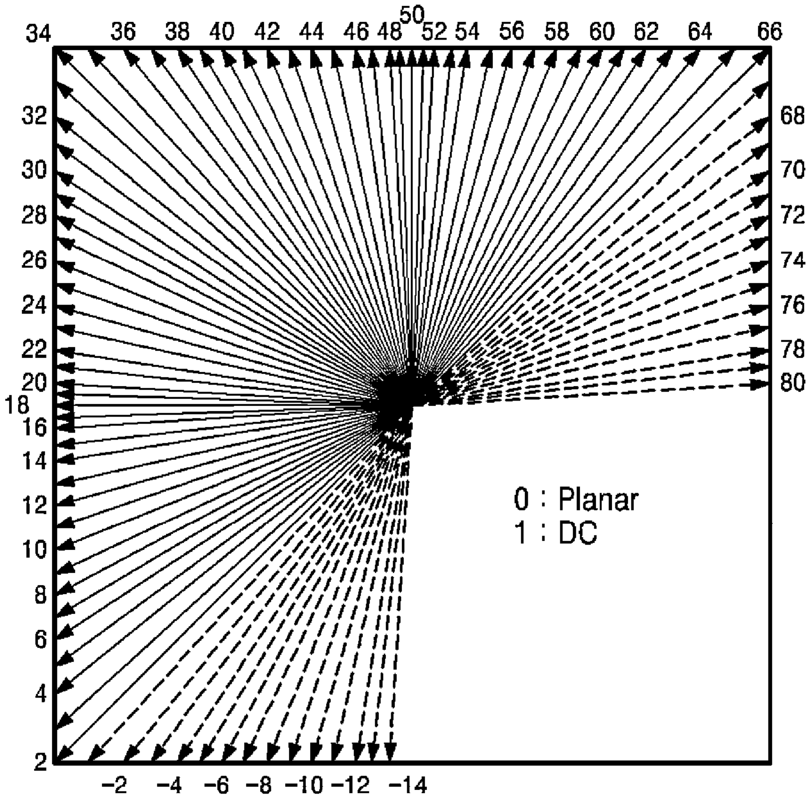

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process.

The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
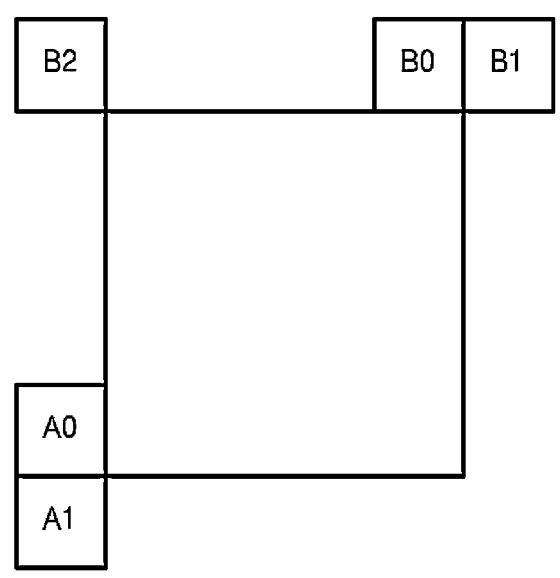
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
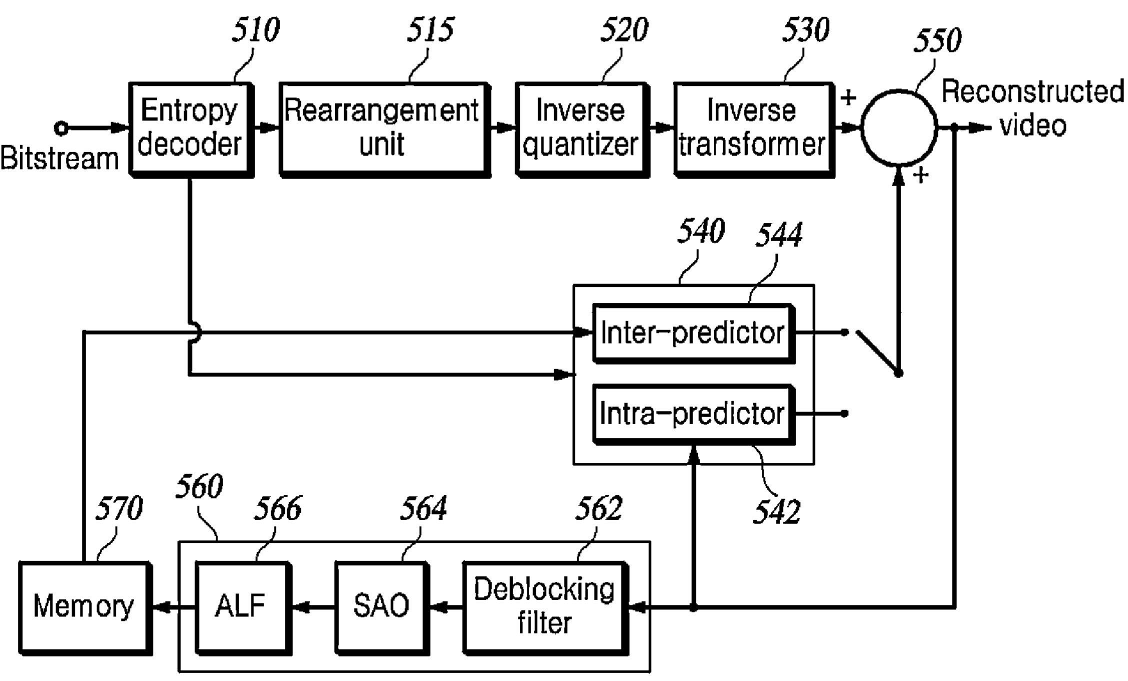
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that perform at least one of adding, pruning, and reordering candidates with respect to a motion vector list at a decoder side based on template matching or bilateral matching in a merge mode and an advanced motion vector prediction (AMVP) mode of inter prediction.

The following embodiments may be performed by the inter predictor 124 in the video encoding device. The following embodiments may also be performed by the inter predictor 544 in the video decoding device.

The video encoding device when encoding the current block may generate signaling information associated with the present embodiments in terms of optimizing rate distortion. The video encoding device may use the entropy encoder 155 to encode the signaling information and may transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Intra Block Copy (IBC)

The IBC performs intra prediction of the current block by copying a reference block in the same frame by using a block vector to generate a prediction block of the current block.

The video encoding device performs block matching to derive an optimal block vector. Here, the block vector represents a displacement from the current block to the reference block. To improve coding efficiency, the video encoding device may split the block vector into a block vector predictor (BVP) and a block vector difference (BVD), may encode, and then may transmit the BVP and BVD to the video decoding device instead of transmitting the whole block vector.

Hereinafter, the spatial resolution of the BVD and the spatial resolution of the block vector are considered to be the same.

In terms of utilizing block vectors, the IBC has inter-predictive characteristics. Therefore, IBC may be categorized into IBC merge/skip mode and IBC AMVP mode.

In IBC merge/skip mode, the video encoding device first composes an IBC merge list. In terms of optimizing coding efficiency, the video encoding device may select a block vector from one of the candidates included in the IBC merge list and may use the selected block vector as a block vector predictor (BVP). The video encoding device determines a merge index that indicates the selected block vector. However, the video encoding device does not generate a BVD. The video encoding device encodes and sends the merge index to the video decoding device. The IBC merge list may be composed in the same way by the video encoding device and the video decoding device. The video decoding device may decode the merge index and then may use the merge index to generate a block vector from the IBC merge list.

The video encoding device, in the case of the IBC skip mode, utilizes the same block vector transmission method as the IBC merge mode but does not transmit a residual block corresponding to the difference between the current block and the prediction block. When in IBC AMVP mode, the video encoding device determines a motion vector and composes an IBC AMVP list to optimize coding efficiency. The video decoding device determines a candidate index that indicates one of the candidate block vectors included in the IBC AMVP list as the BVP. The video encoding device calculates the BVD, which is the difference between the BVP and the motion vector. The video encoding device then encodes and transmits the candidate index and the BVD to the video decoding device.

Meanwhile, the video decoding device decodes the candidate index and the BVD. The video decoding device may obtain the BVP indicated by the candidate index from the IBC AMVP list and then may reconstruct the motion vector by summing the BVP and the BVD.

The following inter-prediction techniques are used to improve coding efficiency and improve the accuracy of inter prediction. These techniques are performed by the inter predictor 124 in the video encoding device but may also be performed by the inter predictor 544 in the video decoding device as described above.

II-1. Merge/Skip Mode, MMVD, AMVP Mode, and AMVR

The merge/skip modes include regular merge mode, merge mode with motion vector difference (MMVD) mode, combined inter and intra prediction (CIIP) mode, geometric partitioning mode (GPM), and subblock merge mode. Here, the subblock merge mode is divided into subblock-based temporal motion vector prediction (SbTMVP) and affine merge mode.

Meanwhile, the Advanced Motion Vector Prediction (AMVP) mode includes a regular AMVP mode, an symmetric MVD (SMVD) mode, and an affine AMVP mode.

The following describes a method of composing a merging candidate list of motion information in regular merge/skip mode. To support the merge/skip mode, the inter predictor 124 in the video encoding device may select a preset number of (e.g., 6) merge candidates to compose a merging candidate list.

The inter predictor 124 searches for a spatial merge candidate. The inter predictor 124 searches for spatial merge candidates from neighboring blocks as illustrated in FIG. 4. At most four spatial merge candidates may be selected. The spatial merge candidate is also referred to as a spatial motion vector prediction (SMVP).

The inter predictor 124 searches for a temporal merge candidate. The inter predictor 124 may add, as a temporal merge candidate, a block that is co-located with the current block in a reference picture (which may be the same as or different from the reference picture used to predict the current block) other than the current picture that holds the target block. One temporal merge candidate may be selected. A temporal merge candidate is also referred to as a temporal motion vector prediction (TMVP).

The inter predictor 124 searches for history-based motion vector predictor (HMVP) candidates. The inter predictor 124 may store the motion vectors of the previous h (where h is a natural number) CUs in a table for future use as merge candidates. The table has a size of 6 and stores the motion vectors of the previous CUs in a first-in-first-out (FIFO) fashion. This means that at most six HMVP candidates are stored in the table. The inter predictor 124 may set the most recent motion vectors among the HMVP candidates stored in the table as the merge candidates.

The inter predictor 124 searches for pairwise average motion vector prediction (PAMVP) candidates. The inter predictor 124 may set the average of the motion vectors of the first candidate and the second candidate in the merging candidate list as the merge candidate.

If the merging candidate list cannot be fulfilled, i.e., the preset number of candidates is not filled after all of the above searches, the inter predictor 124 adds a zero motion vector as the merge candidate.

In terms of optimizing coding efficiency, the inter predictor 124 may determine a merge index that indicates one candidate in the merging candidate list. The inter predictor 124 may use the merge index to derive a motion vector predictor (MVP) from the merging candidate list and then may determine the MVP as the motion vector of the current block. Further, the video encoding device may signal the merge index to the video decoding device.

In the skip mode, the video encoding device utilizes the same method of transmitting the motion vector as in the merge mode but does not transmit a residual block corresponding to the difference between the current block and the prediction block.

The above described method of composing the merging candidate list may be performed equally by the inter predictor 544 in the video decoding device. The video decoding device may decode the merge index. The inter predictor 544 may use the merge index to derive the MVP from the merging candidate list and then may determine the MVP as the motion vector of the current block.

When utilizing the MMVD technique, the inter predictor 124 may use the merge index to derive the MVP from the merging candidate list. For example, the first or second candidate in the merging candidate list may be utilized as the MVP. Further, in terms of optimizing coding efficiency, the inter predictor 124 determines a distance index and a direction index. The inter predictor 124 may use the distance index and the direction index to derive a motion vector difference (MVD) and then may sum the MVD and the MVP to reconstruct the motion vector of the current block. Further, the video encoding device may signal the merge index, the distance index, and the direction index to the video decoding device.

The MMVD technique described above may be equally performed in the video decoding device by the inter predictor 544. The video decoding device may decode a merge index, a distance index, and a direction index. After composing the merging candidate list, the inter predictor 544 may use the merge index to derive an MVP from the merging candidate list. Upon deriving the MVD by using the distance index and the direction index, the inter predictor 544 may sum the MVD and the MVP to reconstruct the motion vector of the current block.

The following describes a method of composing a motion information candidate list in the AMVP mode of inter prediction. To support the AMVP mode, the inter predictor 124 in the video encoding device may select a preset number of (e.g., two) candidates to form a candidate list.

The inter predictor 124 searches for spatial candidates. The inter predictor 124 searches for spatial candidates from neighboring blocks as illustrated in FIG. 4. At most two spatial candidates may be selected.

The inter predictor 124 searches for a temporal candidate. The video encoding device may add, as a temporal candidate, a block that is co-located with the current block within a reference picture (which may not be the same as but different from the reference picture used to predict the current block) other than the current picture that holds the target block. One temporal candidate may be selected.

If the candidate list cannot be fulfilled, i.e., the preset number of candidates is not filled after performing all of the above described searches, the inter predictor 124 adds a zero motion vector as a candidate.

In terms of optimizing coding efficiency, the inter predictor 124 may determine a candidate index that indicates one candidate in the candidate list. The inter predictor 124 may use the candidate index to derive an MVP from the candidate list. Further, in terms of optimizing coding efficiency, the inter predictor 124 determines the motion vector and then subtracts the MVP from the motion vector to calculate the MVD. The video encoding device may signal the candidate index and the MVD to the video decoding device.

The above described method of composing the AMVP candidate list may be equally performed by the inter predictor 544 in the video decoding device. The video decoding device may decode the candidate index and the MVD. The inter predictor 544 may use the candidate index to derive an MVP from the candidate list. The inter predictor 544 may sum the MVD and MVP to reconstruct the motion vector of the current block.

Meanwhile, the video encoding device transmits information that determines the spatial resolution of the MVD along with the MVD. When the AMVR technique is used, the video encoding device may determine an adaptive spatial resolution of the MVD in terms of optimizing bit rate distortion. In this case, the spatial resolution of the MVD and the spatial resolution of the motion vector may be the same.

When AMVR technology is used, the video encoding device signals amvr_flag and amvr_precision_idx to the video decoding device to indicate the spatial resolution of the MVD. For example, if amvr_flag is signaled as being 0, the video decoding device sets the MVD to ¼-pel spatial resolution. Whereas, if amvr_flag is not zero, the video decoding device may determine the spatial resolution of the MVD based on amvr_precision_idx. In this case, the spatial resolution of the selectable MVD may vary based on the prediction method with the AMVR applied. The prediction methods with the AMVR applied are regular AMVP mode, affine AMVP mode, IBC AMVP mode, and the like.

II-2. Affine Merge Mode and Affine AMVP Mode

Inter prediction is a motion prediction that reflects the translation motion model. Inter motion prediction is a technique that predicts motion in the horizontal or x-axis direction and vertical or y-axis direction. However, in reality, there may be various forms of motion such as rotation, zoom-in, or zoom-out in addition to the translation motion. Affine motion prediction may reflect these different types of motion.

Figure 6A:
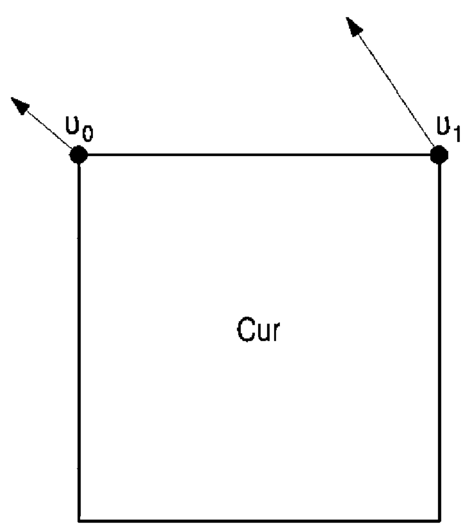
FIGS. 6A and 6B are diagrams illustrating affine motion prediction according to at least one embodiment of the present disclosure.
Figure 6B:
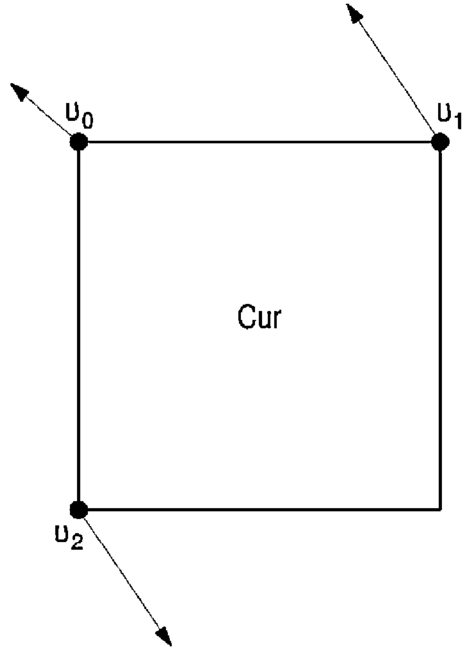

FIGS. 6A and 6B are diagrams illustrating affine motion prediction according to at least one embodiment of the present disclosure.

Two types of affine motion prediction models may exist. Type one is an affine motion prediction model that utilizes four parameters, namely, two control point motion vectors (CPMVs) at the top-left corner and the top-right corner of the target block to be encoded, as illustrated in FIG. 6A. The other affine motion prediction model utilizes three control point motion vectors at the top-left corner, top-right corner, and bottom-left corner of the target block, i.e., six parameters, as illustrated in FIG. 6B.

The four-parameter affine model is represented as shown in Equation 1. The motion at a sample position (x,y) in the target block may be computed as shown in Equation 1. Here, the position of the top-left sample of the target block is assumed to be (0,0).

$$\begin{cases} mv_x = \frac{mv_{1x} - mv_{0x}}{w}x - \frac{mv_{1y} - mv_{0y}}{w}y + mv_{0x} \\ mv_y = \frac{mv_{1y} - mv_{0y}}{w}x + \frac{mv_{1x} - mv_{0x}}{w}y + mv_{0y} \end{cases} \quad \text{[Equation 1]}$$

Further, the six-parameter affine model is represented as shown in Equation 2. The motion at the sample location (x,y) within the target block may be computed as shown in Equation 2.

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{[Equation 2]}$$

Here, $(mv_{0x},mv_{0y})$ is the top-left corner control point motion vector, $(mv_{1x},mv_{1y})$ is the top-right corner control point motion vector, and $(mv_{2x},mv_{2y})$ is the bottom-left corner control point motion vector. Also, W is the horizontal length of the target block and H is the vertical length of the target block.

Affine motion prediction may be performed using a motion vector computed according to Equation 1 or Equation 2 for each sample in the target block. Alternatively, to reduce computational complexity, the affine motion prediction computation may be performed per a subblock basis, for example by dividing the target block into subblocks of size 4×4.

The motion vectors $(mv_x,mv_y)$ may be set to have a 1/16 sample precision. In this case, the motion vector $(mv_x,mv_y)$ calculated according to equation 1 or 2 may be rounded to the nearest 1/16 sample.

The video encoding device performs intra prediction, inter prediction (translation motion prediction), affine motion prediction, and the like and selects the optimal prediction method by calculating the rate-distortion (RD) cost. To perform affine motion prediction, the inter predictor 124 of the video encoding device determines which of the two types of affine motion prediction models to use and determines two or three control points according to the determined affine motion prediction model type. Using the control point motion vectors, the inter predictor 124 computes motion vectors $(mv_x,mv_y)$ for each of the subblocks within the target block. Then, the motion vectors $(mv_x,mv_y)$ of each subblock are used to perform motion compensation within the reference picture per a subblock basis to generate a prediction block for each subblock within the target block.

The video encoding device encodes and passes to the video decoding device affine-related syntax elements including a flag indicating whether affine motion prediction is applied to the target block, type information indicating a type of affine model, and motion information indicating a motion vector of each control point. The type information and the motion information of the control points may be signaled when an affine motion prediction is performed, and the motion vectors of the control points may be signaled as many as determined according to the type information.

The video decoding device determines the type of the affine model and the control point motion vectors by using the signaled syntaxes and computes the motion vectors $(mv_x,mv_x)$ for each 4×4 subblock in the target block by using equation 1 or 2. If the motion vector resolution information about the affine motion vector of the target block is signaled, the motion vectors $(mv_x,mv_x)$ are modified by using an operation such as rounding to a precision identified by the motion vector resolution information.

The video decoding device generates a prediction block for each subblock by performing motion compensation within the reference picture by using the motion vectors $(mv_x,mv_x)$ for each subblock.

To reduce the amount of bits required to encode the control point motion vectors, the regular inter prediction or translation motion vectors as described above may be applied.

As an example, in the case of the affine merge mode, the inter predictor 124 of the video encoding device composes an affine merging candidate list including a predetermined number (e.g., 5) of affine merging candidates. First, the inter predictor 124 of the video encoding device derives the inherited affine merge candidates from the neighboring blocks of the target block. For example, by deriving a predetermined number of inherited affine merge candidates from the neighboring samples A0, A1, B0, B1, and B2 of the target block shown in FIG. 4, a merging candidate list is generated. Each of the inherited affine merge candidates in the candidate list corresponds to the combination of two or three CPMVs.

The inter predictor 124 derives affine merge candidates inherited from control point motion vectors of neighboring blocks of the target block that are predicted in affine mode. In some embodiments, the number of merge candidates derived from neighboring blocks predicted in affine mode may be limited. For example, the inter predictor 124 may derive two inherited affine merge candidates, one of A0 or A1, and one of B0, B1, or B2, from the neighboring blocks predicted in affine mode. The prioritization may be in the order of A0, A1, and then B0, B1, and B2.

On the other hand, if the total number of merge candidates is more than three, the inter predictor 124 may derive constructed affine merge candidates by an insufficient number of merge candidates from the translation motion vectors of the neighboring blocks.

Figure 7:
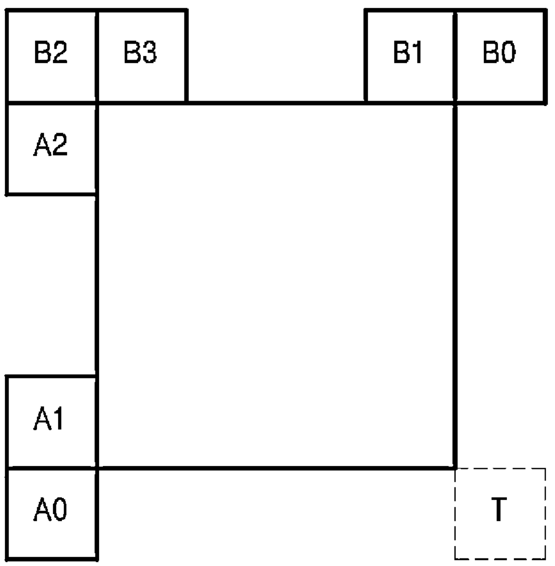
FIG. 7 is a diagram illustrating a method of deriving constructed affine merge candidates for affine motion prediction.

FIG. 7 is a diagram illustrating a method of deriving constructed affine merge candidates for affine motion prediction.

The inter predictor 124 derives one control point motion vector CPMV1, CPMV2, or CPMV3 from each of the neighboring block group {B2, B3, A2}, neighboring block group {B1, B0}, and neighboring block group {A1, A0}. As one example, the order of priority within each neighboring block group may be the order of B2, B3, A2, the order of B1, B0, and the order of A1, A0. Furthermore, yet another control point motion vector CPMV4 is derived from the co-located block T in the reference picture. The inter predictor 124 combines two or three of the four control point motion vectors to generate constructed affine merge candidates by an insufficient number. The priority of the construction is as follows. The elements within each group are listed in the order of top-left corner, top-right corner, and bottom-left corner control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}

If the merging candidate list cannot be fulfilled using the inherited affine merge candidates and constructed affine merge candidates, the inter predictor 124 may add zero-motion vectors as candidates.

The inter predictor 124 selects a merge candidate from the merging candidate list in terms of optimizing coding efficiency and determines a merge index that indicates the merge candidate. The inter predictor 124 performs an affine motion prediction on the target block by using the selected merge candidate. If the merge candidate is composed of two control point motion vectors, an affine motion prediction is performed by using a four-parameter affine model. On the other hand, if the merge candidate is composed of three control point motion vectors, an affine motion prediction is performed by using a six-parameter affine model. The video encoding device encodes and signals the merge index to the video decoding device.

The video decoding device decodes the merge index. The inter predictor 544 of the video decoding device composes a merging candidate list in the same manner as the video encoding device did and performs affine motion prediction by using control point motion vectors corresponding to the merge candidate indicated by the merge index.

As another example, in the affine AMVP mode, in terms of optimizing coding efficiency, the inter predictor 124 of the video encoding device determines the type of affine model and the corresponding actual control point motion vectors for the target block. For each control point, the inter predictor 124 of the video encoding device calculates the MVD, which is the difference between the actual control point motion vector and the MVP of each control point and encodes the MVD of each control point. To derive the MVP of each control point, the inter predictor 124 composes an affine AMVP candidate list including a predetermined number of (e.g., two) affine AMVP candidates. If the target block is of the 4-parameter type, the candidates included in the list are each composed of a pair of two control point motion vectors. On the other hand, if the target block is of the 6-parameter type, the candidates included in the list are each composed of a pair of three control point motion vectors.

Figure 8:
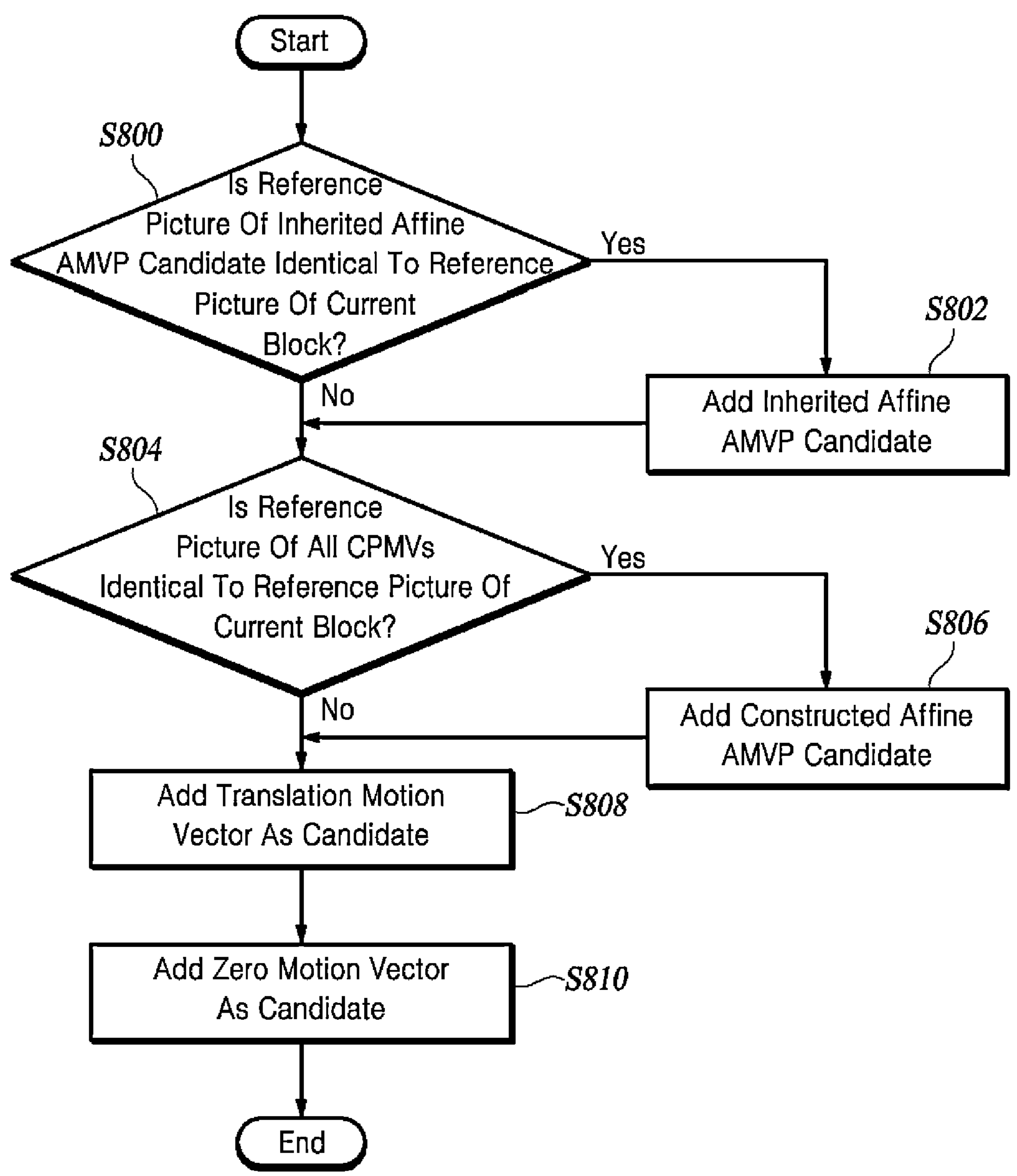
FIG. 8 is a flowchart of a process for searching affine advanced motion vector predictor (AMVP) candidates in affine AMVP mode, according to at least one embodiment of the present disclosure.

Using the example of FIG. 8, the following describes a method of composing a candidate list in affine AMVP mode. The affine AMVP candidate list may be derived similarly to the above described method of composing an affine merging candidate list.

FIG. 8 is a flowchart of a process for searching affine AMVP candidates in affine AMVP mode, according to at least one embodiment of the present disclosure.

The inter predictor 124 checks whether the reference picture of the inherited affine AMVP candidate is identical to the reference picture of the current block (S800). Here, the inherited affine AMVP candidate may be a block predicted in affine mode among the neighboring blocks A0, A1, B0, B1, B2 of the target block shown in FIG. 4, as in the affine merge mode described above.

If the reference picture of the inherited affine AMVP candidate is identical to the reference picture of the current block (Yes in S800), the inter predictor 124 adds the corresponding inherited affine AMVP candidate (S802).

If the reference picture of the inherited affine AMVP candidate is not identical to the reference picture of the current block (No in S800), the inter predictor 124 verifies whether the reference picture of all CPMVs of the constructed affine AMVP candidate is identical to the reference picture of the current block (S804). Here, all CPMVs of the constructed affine AMVP candidate may be derived from the motion vectors of the neighboring samples shown in FIG. 7, as in the affine merge mode described above.

If the reference picture of all CPMVs of the constructed affine AMVP candidates is identical to the reference picture of the current block (Yes in S804), the inter predictor 124 adds the corresponding constructed affine AMVP candidate (S806).

At this point, the affine model type of the target block needs to be considered. If the affine model type of the target block is a 4-parameter type, the video encoding device uses the affine model of the neighboring blocks to derive the two control point motion vectors of the top-left corner and top-right corner control point motion vectors of the target block. If the affine model type of the target block is a 6-parameter type, the affine model of the neighboring blocks is used to derive the three control point motion vectors of the top-left corner, top-right corner, and bottom-left corner control point motion vectors of the target block.

If the reference picture of all CPMVs is not identical to the reference picture of the current block (No in S804), the inter predictor 124 adds translation motion vectors as affine AMVP candidates (S808). The translation motion vectors, in the order of $mv_0$, $mv_1$, and $mv_2$, may be utilized to predict the CPMV of the current block.

If the candidate list cannot be fulfilled, i.e., filled up with the preset number of candidates after performing all of the above steps (S800 through S808), the inter predictor 124 adds the zero motion vector as an affine AMVP candidate (S810).

The inter predictor 124 selects one candidate from the affine AMVP list and determines a candidate index that indicates the selected candidate. Here, each control point motion vector of the selected candidate corresponds to an MVP for each control point. In terms of optimizing coding efficiency, the inter predictor 124 determines the actual control point motion vector for each control point of the target block and then calculates the MVD between the actual control point motion vector and the MVP of the control point. The video encoding device encodes and signals the affine model type of the target block, the candidate index, and the MVD of each control point to the video decoding device.

The video decoding device decodes the affine model type, the candidate index, and the MVD of each control point. The inter predictor 544 of the video decoding device generates an affine AMVP list in the same manner as the video encoding device did and selects a candidate indicated by the candidate index from the affine AMVP list. The inter predictor 544 of the video decoding device reconstructs the motion vector of each control point by summing the MVP of each control point of the selected candidate and its corresponding MVD. The inter predictor 544 performs affine motion prediction by using the reconstructed control point motion vectors.

II-3. Geometric Partitioning Mode (GPM)

Figure 9:
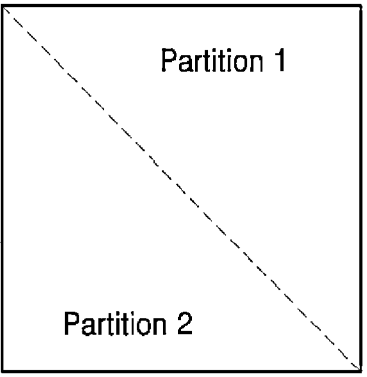
FIG. 9 is a diagram illustrating triangular partition types supported in geometric partitioning mode, according to at least one embodiment of the present disclosure.
Figure 9:
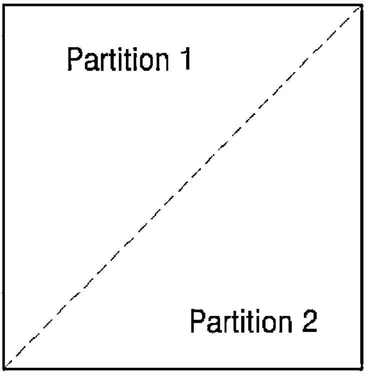

FIG. 9 is a diagram illustrating triangular partition types supported in geometric partitioning mode, according to at least one embodiment of the present disclosure.

In GPM, the inter predictor 124 performs inter prediction based on the triangular blocks obtained by partitioning the current block. The GPM supports two triangular partition types, as illustrated in FIG. 9. In each triangular partition type, with respect to the two triangular regions, the inter predictor 124 performs inter predictions by using different motion information, i.e., motion vectors.

Figure 10:
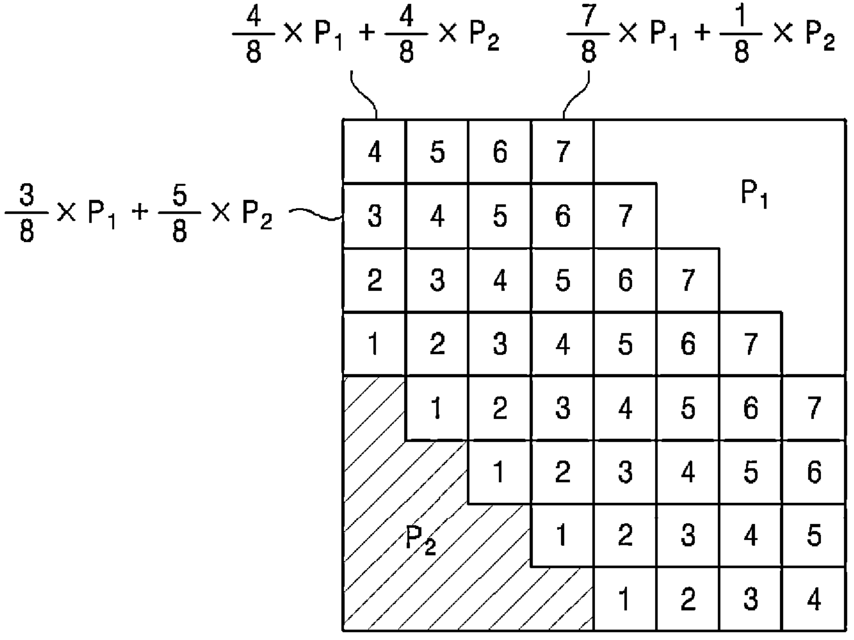
FIG. 10 is a diagram illustrating weights utilized in a geometric partitioning mode (GPM), according to at least one embodiment of the present disclosure.

The inter predictor 124 generates the final predicted signals by weight-summing the predicted signals from each region to minimize discontinuities at the boundaries between the partition regions. The weights utilized to generate the final predicted signals may be illustrated in FIG. 10. In FIG. 10, P1 is a current block's predictor that is based on the motion information of the top-right triangular block, and P2 is a current block's predictor that is based on the motion information of the bottom-left triangular block.

Figure 11:
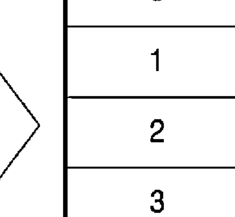
FIG. 11 is a diagram illustrating a geometric partitioning mode (GPM) candidate list according to at least one embodiment of the present disclosure.

FIG. 11 is a diagram illustrating a GPM candidate list according to at least one embodiment of the present disclosure.

When composing the GPM candidate list, the motion information of each partition region is derived from a regular merging candidate list, as illustrated in FIG. 11. If the index of the merging candidate list is even, the motion information in the first reference list L0 is selected, and if the index is odd, the motion information in the second reference list L1 is selected.

II-4. Template Matching

Figure 12:
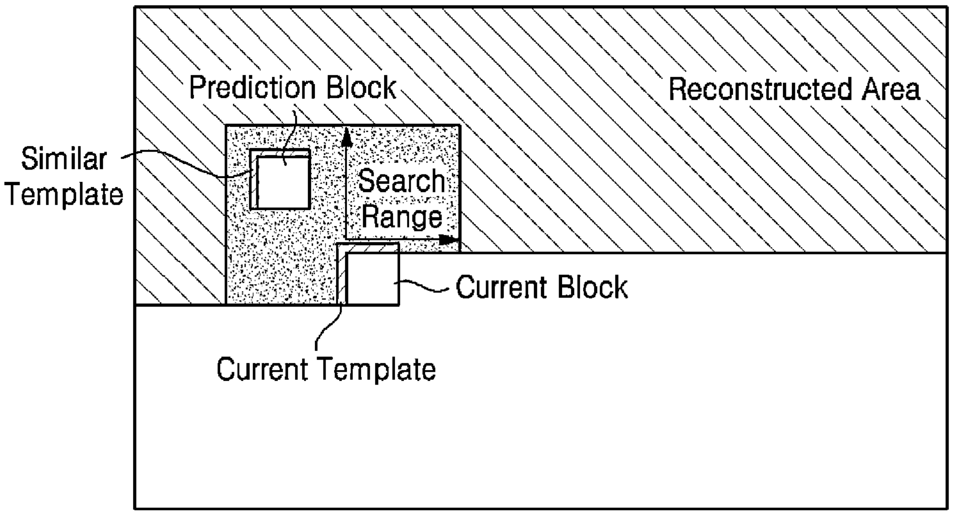
FIG. 12 is a diagram illustrating template matching in intra prediction, according to at least one embodiment of the present disclosure.

FIG. 12 is a diagram illustrating template matching in intra prediction, according to at least one embodiment of the present disclosure.

In template matching (TM) mode, the intra predictor 122 in the video encoding device searches for an optimal reference block by using a template in the reconstructed region of the current frame and applies the optimal reference block as a prediction block, as illustrated in FIG. 12. By calculating how much the L-shaped template matches the current template to search for the most similar template to the current template, and the block corresponding to the similar template may be used as the prediction block. The search range of the template may be preset, and the prediction of the current block may be performed based on the preset search range.

Meanwhile, the adaptive reordering of merge candidates with template matching (ARMC) technique adaptively reorders the merge candidates of the inter prediction based on the template matching described above. The reordering scheme of merge candidates may be applied to regular merge mode, template matching merge mode, or affine merge mode, excluding SbTMVP candidates.

For example, in a template matching merge mode, the inter predictor 124 in the video encoding device may compose a merging candidate list, may partition the merge candidates into subgroups of size 5, and for each subgroup, and may reorder the merge candidates in ascending order, i.e., in order of increasing cost according to the template matching cost or TM cost. The TM cost may be defined by the sum of absolute differences (SAD) or the sum of squared differences (SSE) between the template samples of the current block and the corresponding reference samples.

Figure 13:
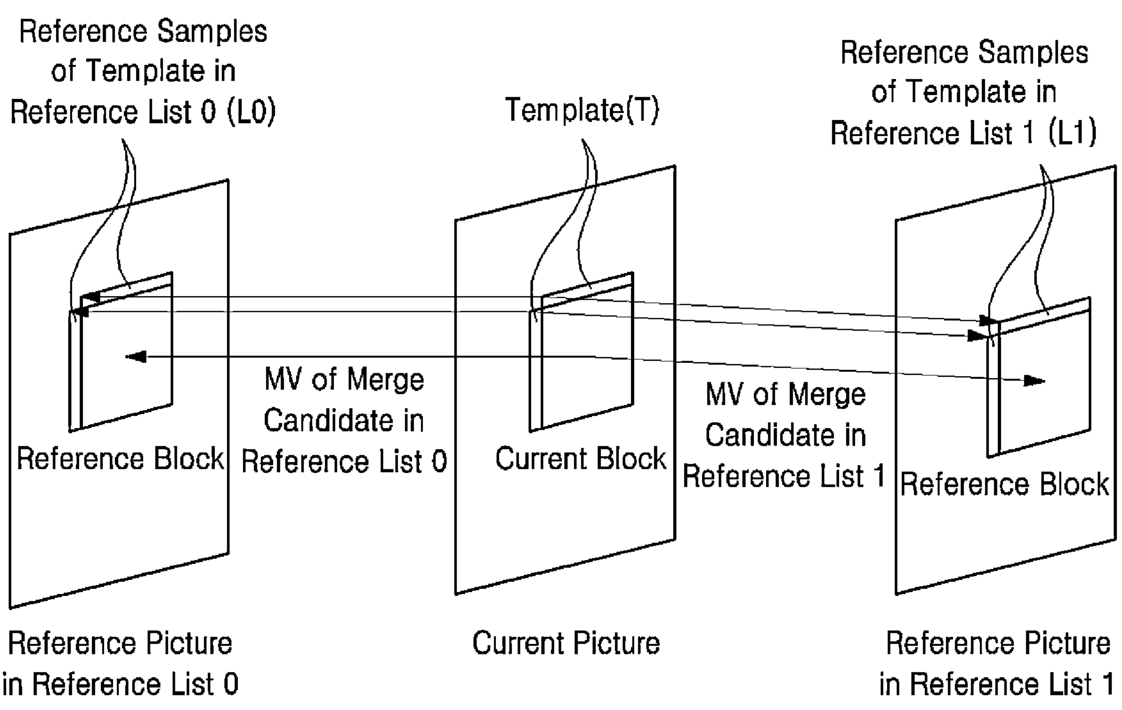
FIG. 13 is a diagram illustrating template matching in bi-prediction, according to at least one embodiment of the present disclosure.

On the other hand, if the merge candidate uses bi-prediction, the inter predictor 124 may derive reference samples of the merge candidate template based on the bi-prediction, as illustrated in FIG. 13.

II-5. DMVR and Multipath Decoder-Side Motion Vector Refinement

Decoder-side Motion Vector Refinement (DMVR) is a method of refining the motion vectors at the decoder side by fine-tuning the motion vectors (MV0 and MV1) in the bi-prediction by using bilateral matching (BM) technique. Hereinafter, the motion vectors in the bi-prediction are utilized compatibly with the motion vector pair.

In bi-prediction, the video encoding device searches for refined motion vectors around the initial motion vectors generated from the reference pictures in the reference lists L0 and L1. Here, the initial motion vectors are the two motion vectors MV0 and MV1 of the bi-prediction. In the BM technique, the BM cost, which is the distortion between the two candidate blocks in the reference pictures of L0 and L1, is calculated. As the BM cost, the SAD or SSE between the two candidate blocks may be calculated. The video encoding device generates the candidate motion vectors with the minimum BM cost as the refined motion vectors as shown in Equation 3.

$$MV0' = MV0 + \mathrm{MVoffset}$$

$$MV1' = MV1 - \mathrm{MVoffset} \quad \text{[Equation 3]}$$

Here, MV_offset, which is an offset applied to the initial motion vectors as the motion vector refinement progresses, is the difference between the candidate motion vectors and the initial motion vectors. This offset may be formed as the sum between an integer offset in integer sample units and a sub-pixel offset in sub-pixel or sub-pel sample units. As shown in Equation 3, a mirroring rule is followed by the offset of two motion vector candidates.

Multi-pass decoder-side motion vector refinement is a method of refining motion vectors in multiple passes at the decoder side by using BM techniques. Hereinafter, multi-pass decoder-side motion vector refinement using BM techniques is referred to as multi-pass bilateral matching (MBM).

The video encoding device searches the motion vectors in units of CUs in a first pass of multiple passes of MBM and searches the motion vectors for each 16×16 subblock within the CU in a second pass. In a third pass, the video encoding device applies Bi-directional Optical Flow (BDOF) to search for the motion vectors for each 8×8 subblock. The refined motion vectors resulting from this search are stored for the prediction of spatial and temporal motion vectors. Here, BDOF is a technique that further compensates for the motion of the predicted samples by using bi-directional motion prediction, based on the assumption that the samples or objects forming the video move at a constant speed and the assumption that there is little change in the sample values.

The multi-pass decoder-side motion vector refinement specifically performs the following steps.

In the first pass, the video encoding device uses as initial values the motion vectors (MV0 and MV1) in the bi-prediction, generated from the reference pictures in the reference lists L0 and L1 to generate refined motion vectors (MV0_pass1 and MV1_pass1) around the motion vectors (MV0 and MV1). The refined motion vectors may be generated based on the minimum BM cost for the two reference blocks L0 and L1, as shown in Equation 4.

$$\text{MV0\_pass1} = MV0 + deltaMV \qquad \text{[Equation 4]}$$

$$\text{MV1\_pass1} = MV1 - deltaMV$$

Here, deltaMV may be searched according to a 3×3 square search pattern around the initial MV with a precision of integer samples around the initial value.

In the second pass, the video encoding device applies the BM to the 16×16 subblocks. For each subblock, the video encoding device generates MV0_pass2 and MV1_pass2 by refining the motion vectors around MV0_pass1 and MV1_pass1 obtained from the reference lists L0 and L1 in the first pass. At this time, the motion vectors are searched at an integer sample precision. Then, the video encoding device generates deltaMV (sbIdx2) as shown in Equation 5, by using a subsample-wise refinement process according to DMVR technology.

$$\text{MV0\_pass2}(sbIdx2) = \text{MV0\_pass1} + deltaMV(sbIdx2) \qquad \text{[Equation 5]}$$

$$\text{MV1\_pass2}(sbIdx2) = \text{MV1\_pass1} - deltaMV(sbIdx2)$$

Here, sbIdx2 represents the index of the 16×16 subblock.

In the third pass, the video encoding device applies BDOF to the 8×8 subblocks to derive the final motion vectors. For each 8×8 subblock, the video encoding device applies the BDOF to the motion vectors obtained in the second pass. The final motion vectors generated in the third pass, MV0_pass3, and MV1_pass3, are represented as shown in Equation 6.

$$\text{MV0\_pass3}(sbIdx3) = \text{MV0\_pass2}(sbIdx2) + bioMv \qquad \text{[Equation 6]}$$

$$\text{MV1\_pass3}(sbIdx3) = \text{MV0\_pass2}(sbIdx2) - bioMv$$

Here, sbIdx3 represents the index of an 8×8 subblock and bioMV represents the correction value due to the application of BDOF.

For each pass, MBM cost represents the cost of block matching between two blocks indicated by the searched motion vectors. Additionally, deltaMV, deltaMV (sbIdx2), and bioMV are collectively referred to as the refinement values of the refined motion vectors, or "refinement values." Further, for the initial motion vectors of the first pass, the refinement value may represent the sum of all or a portion of deltaMV, deltaMV (sbIdx2), and bioMV.

II-6. Bilateral Matching AMVP-MERGE Mode

Figure 14:
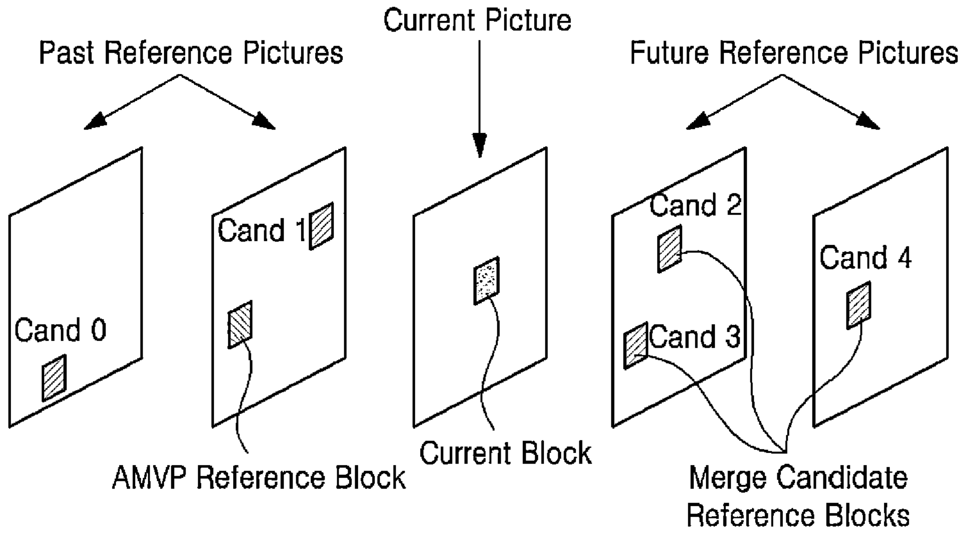
FIG. 14 is a diagram illustrating a bilateral matching AMVP-MERGE mode according to at least one embodiment of the present disclosure.

FIG. 14 is a diagram illustrating a bilateral matching AMVP-MERGE mode according to at least one embodiment of the present disclosure.

In the bilateral matching AMVP-MERGE mode (BM AMVP-MERGE mode), the video encoding device refines the motion vector of the merge candidate with respect to a reference picture in the opposite direction that is temporally equidistant from the reference picture when the uni-directional AMVP mode is selected for the reference picture in the LX (X=0 or 1) direction. For the refinement, a bilateral matching technique is utilized.

For the bilateral matching-based motion vector refinement, the video encoding device generates the refined motion vector by applying the multi-pass decoder-side motion vector refinement by using the AMVP vector in the LX direction and the merge candidate motion vector in the L1-X direction as initial values. At this time, the AMVP motion vector may be changed as much as the merge candidate motion vector is refined. For example, if the AMVP motion vector refinement value is MVD0, the merge candidate motion vector refinement value MVD1 may be −MVD0.

III. Adding, Pruning, and Reordering Candidates in a Motion Vector List

Implementations of the present disclosure are described below about the video encoding device, but may also be applied to the video decoding device.

Hereinafter, the motion vector list includes candidates. In Example 1 and Example 3, each candidate may be a pair of motion vectors MV0 and MV1 in the bi-prediction, i.e., a motion vector pair. In Example 2, each candidate may include a motion vector pair or a motion vector from a uni-prediction as motion information.

<Example 1> Method Using MBM for Modifying Merging Candidate List and AMVP Candidate List The video encoding device may modify the merging candidate list and the AMVP candidate list by using the MBM as follows.

First, the video encoding device may refine each candidate motion vector pair by using 3-stage multiple passes of the MBM. The video encoding device may utilize the finalized motion vectors generated in the third pass but may selectively add motion vectors from each stage to the AMVP candidate list or merging candidate list. For example, in regular merge mode, the refined motion vectors from the first pass generated in CU units or the refined motion vectors from the second pass generated in 16×16 subblocks may be added to the candidate list.

If DMVR mode is applied, the refined motion vectors of the first pass may be utilized.

Further, if DMVR mode and affine merge mode are applied, the refinement value (deltaMV) of the refined motion vectors generated in the first pass may be added to all CPMVs of each constructed affine candidate in the affine merging candidate list.

Furthermore, if the candidates are determined in units of subblocks, such as subblock-based merge mode or affine-based motion vector candidates, the refined motion vectors of the third pass in addition to the first and second passes may be added to the candidate list.

On the other hand, when AMVR is applied, the video encoding device may add motion vectors exclusively that are greater than or equal to a minimum luma sample unit according to amvr_precision_idx. For this purpose, multiple passes of the MBM may be adaptively selected for the relevant CU.

In one example, the video encoding device may perform the following operations on the AMVP candidate list by using the MBM: adding candidates, reordering the list, pruning the list, and the like.

As described above, the video encoding device may generate refined motion vectors (MV0_passN, MV1_passN) by refining an existing motion vector pair (MV0, MV1) with three multiple passes of the MBM. Here, the existing motion vector pair represents the motion vectors in the bi-prediction as candidates included in the AMVP candidate list. For the existing motion vector pair (MV0, MV1), the video encoding device generates one refined motion vector pair (MV0_passN, MV1_passN) but is not necessarily limited thereto. For example, one or more refined motion vector pairs may be generated for the existing motion vector pair based on the application of multiple passes.

To add candidates, the video encoding device adds the refined motion vectors (MV0_passN, MV1_passN) to an existing AMVP candidate list. When added to the list, the refined motion vectors may be added at a fixed location. For example, the refined motion vectors may be placed at the end of the list. Alternatively, the refined motion vectors may be prioritized at the top of the list.

Further, to prune the AMVP candidate list, the video encoding device may replace or delete existing motion vectors from the list with the refined motion vectors. The replacement or deletion may be selected by calculating a cost difference between the refined motion vectors and the existing motion vectors. Here, the cost represents the MBM cost.

The replacement is to replace the existing motion vectors in the list with the refined motion vectors if the refined motion vectors are better in terms of cost than the existing motion vectors. If the refined motion vectors are not better in cost than the existing motion vectors, then the refined motion vectors are not added to the list. Alternatively, the deletion means that, for a candidate list to which the refined motion vector pairs of candidates are added, the best candidates in terms of MBM cost are kept by the list size, and the remaining candidates are removed. In this case, the MBM cost may be calculated by assuming deltaMV to be zero for the existing motion vector pairs.

Further, to reorder the list, the video encoding device may reorder the motion vector candidates in the AMVP candidate list based on MBM cost. For example, the candidates may be prioritized by sorting the candidates in ascending order based on the MBM cost. Further, the video encoding device may reorder the candidates based on MBM cost for an AMVP candidate list with candidates having been added or pruned.

As another example, the video encoding device may perform the following operations on the regular merging candidate list by using the MBM: adding candidates, reordering the list, pruning the list, etc.

As described above, the video encoding device refines the existing motion vector pair MV0, MV1 by utilizing 3-stage multiple passes of the MBM to generate refined motion vectors MV0_passN and MV1_passN. Here, the existing motion vector pairs represent the motion vectors in the bi-prediction as candidates included in the merging candidate list.

To add candidates, the video encoding device adds the refined motion vectors (MV0_passN, MV1_passN) to the existing merging candidate list. When added to the list, the refined motion vectors may be added at fixed positions. For example, the refined motion vectors may be at the end of the list or at the top priority.

Alternatively, the video encoding device may add the refined motion vectors to a particular rank in the merging candidate list, taking into account a predetermined condition. The video encoding device may calculate the MBM cost for the candidates in the list and take into account their diversity. For example, the video encoding device may calculate the cost difference between the previous candidate at a particular ranking and the refined motion vectors and compare the cost difference to a preset threshold. If the particular ranking is the highest priority, the cost difference between the highest priority candidate and the refined motion vectors may be calculated. If the calculated cost difference is greater than or equal to the threshold, the video encoding device places the refined motion vectors in the particular ranking. If, on the other hand, the calculated cost difference is less than the threshold, the video encoding device determines that the refined motion vectors are redundant with the preceding candidate, and the video encoding device repeats the process described above for the next ranked candidate to the particular ranking.

Here, the threshold may be set based on a quantization parameter. For example, the threshold may be set as a Lagrangian parameter used for rate-distortion optimization.

Further, for pruning the merging candidate list, the video encoding device may replace or delete existing motion vectors in the list with refined motion vectors. The replacement or deletion may be selected by calculating a cost difference between the refined motion vectors and the existing motion vectors. Here, the cost represents the MBM cost.

The replacement means replacing the existing motion vectors in the list with the refined motion vectors if the latter is more cost-effective than the existing motion vectors. The deletion means that if the refined motion vectors are not better in terms of cost than the existing motion vectors, then the refined motion vectors are not added to the list. Alternatively, the deletion means that for a candidate list with pairs of candidate refined motion vectors having been added, the best candidates in terms of MBM cost are kept by the list size, and the remaining candidates are removed. In this case, the MBM cost may be calculated after assuming deltaMV to be zero for the existing motion vectors.

Alternatively, for reordering the list, the video encoding device may reorder the motion vector candidates in the merging candidate list based on the MBM cost. For example, the candidates may be prioritized by sorting the candidates in ascending order based on the MBM cost. Further, the video encoding device may reorder the candidates based on MBM cost for a merging candidate list with candidates having been added or pruned.

The video encoding device may add the refined motion vectors based on TM, BM, or MBM when the encoded motion vectors are stored in the HMVP table. Further, the existing HMVP table may be updated in a FIFO format, but in this implementation, the motion vectors in the HMVP table may be reordered based on TM cost or MBM cost.

Further, the video encoding device may reorder the GPM candidate list as follows.

In a conventional method, when composing a GPM candidate list, the motion information of each of the two regions obtained by diagonally dividing the current block region is derived from a regular merge mode candidate list.

The conventional method may depend on whether the index is even/odd to compose a candidate list by using the motion information in L0/L1. In this embodiment, the video encoding device dismisses this composing method and may compose the candidate list by prioritizing the motion information in the merge mode candidate list based on the MBM cost. The MBM cost may be calculated based on the motion information, i.e., motion vectors of the two regions.

Figure 15:
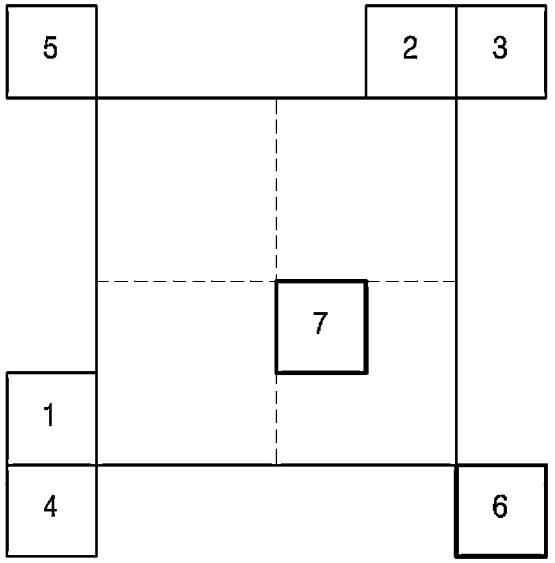
FIG. 15 is a diagram illustrating neighboring blocks for deriving a motion information candidate list, according to at least one embodiment of the present disclosure.

Alternatively, to select the motion information for each of the two regions, the video encoding device may select the reference block with the smallest TM cost. The uni-directional motion information of each reference block may be selected from a motion information candidate list derived from the neighboring blocks of the current block, as illustrated in FIG. 15. To improve coding efficiency, the video encoding device may compose the candidate list by prioritizing the motion information based on TM cost.

In a conventional GPM (Geometric Partitioning Mode), blocks may be partitioned according to two partitioning methods utilizing a top left-to-bottom right oblique line or a top right-to-bottom left oblique line, as illustrated in FIG. 9. The template matching according to the present embodiment just takes the partitioning method using the top left-to-bottom right oblique line where there are pixels neighboring the current block.

The video encoding device when working in GPM may signal a flag indicating whether to use the reordering method.

Alternatively, the video encoding device may use a TM/BM-based method for composing a motion information candidate list of the GPM. In this case, the template of the current block may utilize top and left reference samples according to the regular TM/BM method, but the template of the reference block may utilize samples at locations indicated by motion vectors derived from subblocks adjacent to the boundary of the current block. During the template matching search of the GPM, the video encoding device performs, as the motion information of one of the two triangular partition regions is retained, a matching search for the other triangular partition region. The video encoding device may repeat the template-matching search process described above for all regular merge mode candidates.

As another example, the video encoding device may utilize the MBM to reorder the affine merging/AMVP candidate list.

In the affine mode process, the video encoding device organizes the candidate list with inherited affine candidates, constructed affine candidates, and the like. At this time, a priority may be determined among the candidates in the list based on the MBM method.

When determining the constructed affine candidate, the video encoding device checks the existence of the motion vectors in the order B2→B3→A2 of the neighboring blocks as illustrated in FIG. 7 and sets the first available motion vector as CPMV1. At this time, the video encoding device reorders the available motion vectors based on the MBM cost and determines the CPMV1 according to priority. Similarly, the video encoding device may determine the CPMVs (CPMV2 and CPMV3) based on the MBM cost by following the order B1→B0 to check the motion vectors and set CPMV2, and by following the order A1→A0 to check the motion vectors and set CPMV3.

In the affine merge mode, the video encoding device may generate the refined motion vectors by using the first pass of the MBM for the current block and then may add the refinement value (deltaMV) of the refined motion vectors to all CPMVs of each constructed affine candidate in the list. For the initial value to apply the first pass, a motion vector pair of the current block may be used.

Alternatively, in the affine merge mode, the video encoding device may generate the refined motion vectors by using the first pass of the MBM for the current block and then may add the refinement value (deltaMV) of the refined motion vectors to the CPMVs selected from the neighboring blocks.

When determining the constructed affine candidate, the video encoding device checks for the presence of motion vectors in the order of candidate blocks B2→B3→A2, as illustrated in FIG. 7, and sets the first available motion vector as CPMV1. Similarly, the video encoding device checks the motion vectors in the order B1→B0 to set CPMV2 and checks the motion vectors in the order A1→A0 to set CPMV3. At this time, the video encoding device does not use the fixed CPMVs but calculates a regression model that estimates the affine parameters by using the motion vectors of the neighboring blocks of the current block and recalculates the modified CPMVs of the current block from the model. The video encoding device may generate the refined motion vectors by using the first pass of the MBM for the current block and then may add the refinement value (deltaMV) of the refined motion vectors to the modified CPMVs.

<Example 2> Method Using TM for Modifying Merging Candidate List and AMVP Candidate List The video encoding device performs a template matching for each candidate in the AMVP/merge list and calculates a template cost. The video encoding device may then reorder the list in order of increasing TM cost.

In one example, the video encoding device may reorder the candidates in the regular AMVP candidate list based on template matching.

The video encoding device may compose the AMVP candidate list to include at most two prediction candidates by adding the HMVP candidate to the spatial candidate and the temporal candidate. The video encoding device may then reorder the candidates by using the TM cost. Alternatively, the video encoding device may select the candidate based on the TM cost when selecting a candidate from the list.

Figure 16:
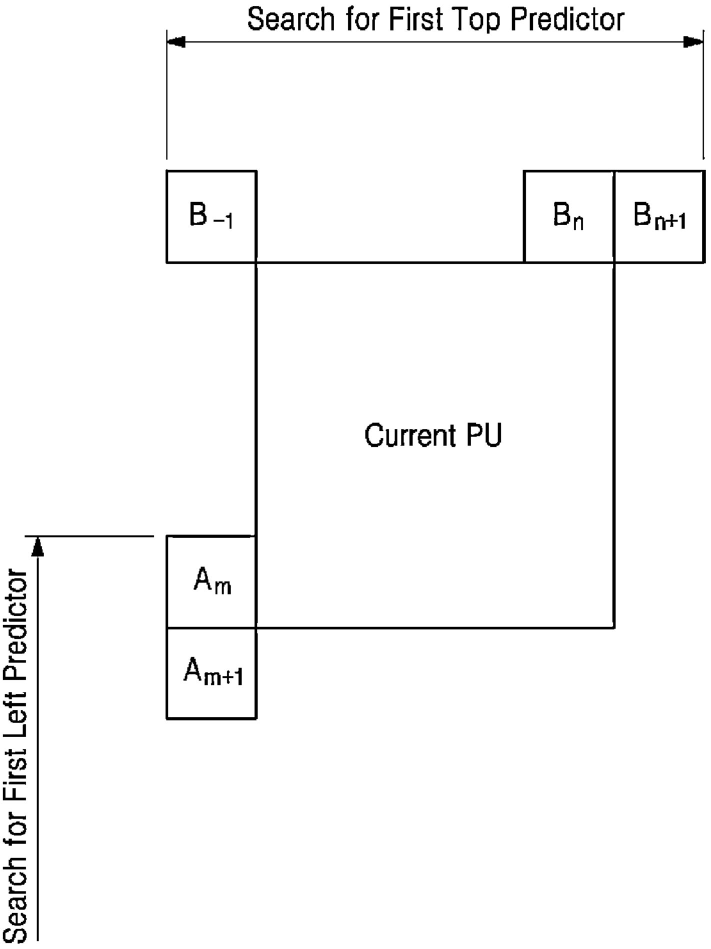
FIG. 16 is a diagram illustrating neighboring blocks for deriving spatial candidates, according to at least one embodiment of the present disclosure.

The video encoding device may reference the left and top blocks to take one candidate for each of the left and top blocks and may use at most two candidates as spatial candidates. As illustrated in FIG. 16, the video encoding device may select one of $A_m$ and $A_{m+1}$ positioned on the left as a candidate, and one of $B_{-1}$, $B_n$, and $B_{n+1}$ positioned on the top as a candidate. The video encoding device then proceeds to the encoding process with rate distortion optimization. In this implementation, the video encoding device may determine the candidates based on TM cost when determining the candidates at the left and top.

As another example, the video encoding device may reorder the affine AMVP/merge candidates based on template matching.

In the affine mode process, the video encoding device may compose the affine AMVP candidate list to include inherited affine candidates, constructed affine candidates, and the like. At this time, the video encoding device may use TM to determine a prioritization among the candidates.

In determining the constructed affine candidate, the video encoding device checks for the presence of motion vectors in the order of candidate blocks B2→B3→A2, as illustrated in FIG. 7, and sets the first available motion vector to CPMV1. At this time, the video encoding device reorders the motion vectors based on the TM cost and determines the CPMV1 according to priority. Similarly, the video encoding device may check the motion vectors in the order B1→B0 to set CPMV2, may check the motion vectors in the order A1→A0 to set CPMV3 and may determine the CPMVs based on the TM cost.

If there is more than one inherited affine candidate or more than one constructed affine candidate, more than one inherited affine candidate or more than one constructed affine candidate may be divided into subgroups respectively. The video encoding device then reorders the list by determining a prioritization based on template matching within the subgroups.

Figure 17:
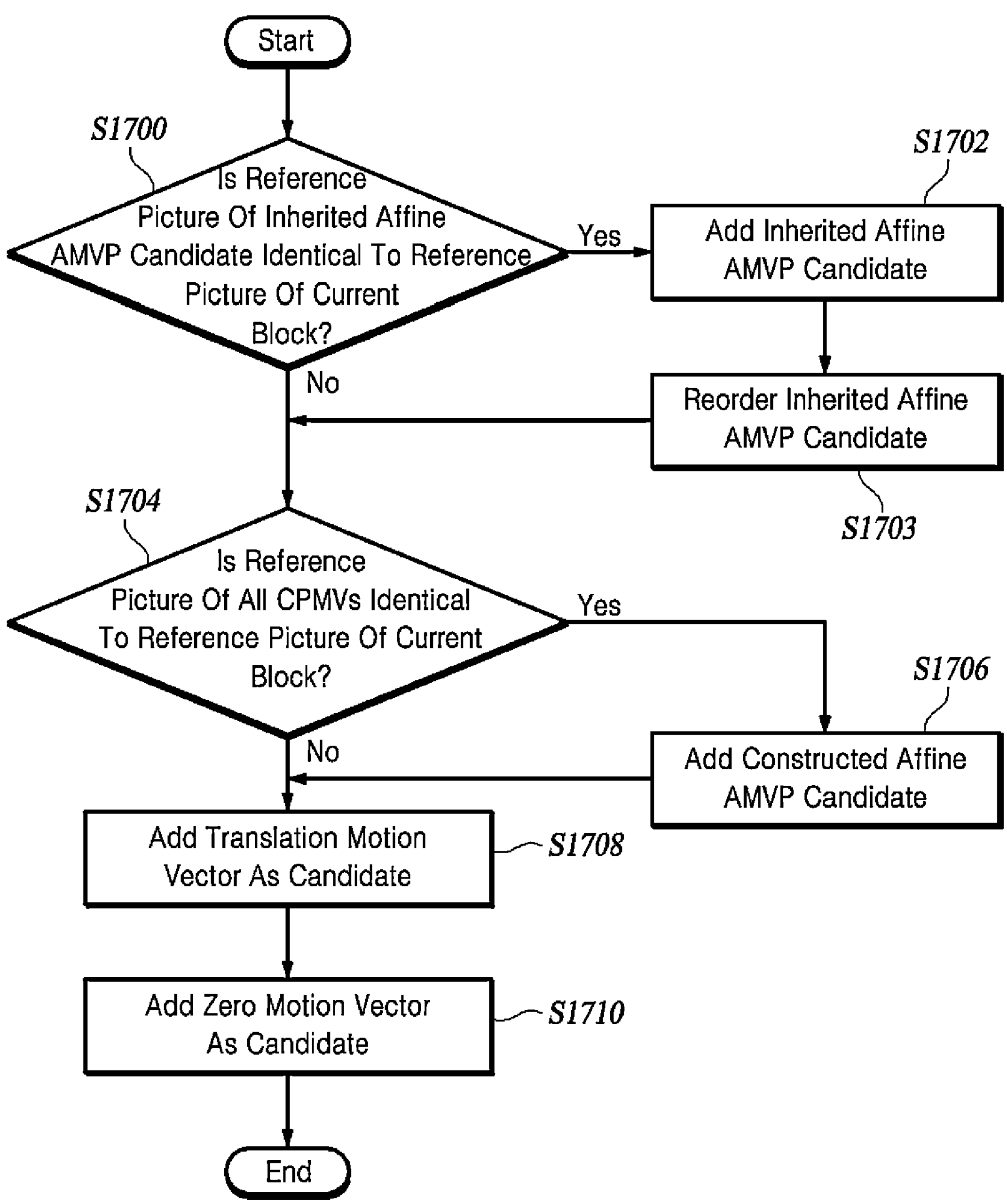
FIG. 17 is a flowchart of a process for searching affine AMVP candidates, including reordering inherited affine AMVP candidates, according to at least one embodiment of the present disclosure.

FIG. 17 is a flowchart of a process for searching affine AMVP candidates, including reordering inherited affine AMVP candidates, according to at least one embodiment of the present disclosure.

In the example of FIG. 17, the video encoding device reorders the inherited affine AMVP candidates within a subgroup containing the inherited affine AMVP candidates by determining a prioritization based on template matching for the subgroup (S1703). In the example of FIG. 17, the remaining steps are the same as in the example of FIG. 8, so further description is omitted.

As yet another example, the video encoding device may reorder the candidates in the TM AMVP/TM merging candidate list.

The video encoding device may perform a template matching on each candidate in the TM AMVP/TM merging candidate list to calculate a template matching (TM) cost. The video encoding device may then reorder the candidates in the list in order of increasing TM cost.

The video encoding device may refine existing motion information by using TM to generate refined motion information. Here, the existing motion information represents a motion vector in a uni-prediction or a motion vector pair (MV0, MV1) in a bi-prediction included in the candidate list.

When TM is used to refine the candidate motion information, the video encoding device may calculate a TM cost by reflecting the shape of the current block. For example, if the block is elongated in the horizontal direction, the top samples of the template may be utilized, and if the block is elongated in the vertical direction, the left samples may be utilized.

When generating refined motion information by using TM, the video encoding device may not add the refined motion information to the list if the TM cost is greater than a predetermined threshold. In this case, the threshold is calculated by considering the TM cost of the first candidate. For example, the threshold may be set by multiplying the TM cost of the first candidate by N, e.g., 5.

As another example, the video encoding device may perform candidate addition, list reordering, list pruning, and the like, on the regular merging candidate list based on the TM as follows. Hereinafter, the motion information refers to a motion vector in uni-prediction or a motion vector pair (MV0, MV1) in bi-prediction.

First, the video encoding device refines the existing motion information by using TM to generate refined motion information.

For candidate addition, the video encoding device adds the refined motion information to an existing merging candidate list. When added to the list, the refined motion information may be added at a fixed location. For example, the refined motion information may be at the end of the list or at the top priority of the list.

Alternatively, the video encoding device may add the refined motion information to a specific rank in the merging candidate list, taking into account a predetermined condition. The video encoding device may calculate TM costs for the candidates in the list and may take into account their diversity. For example, the video encoding device may calculate the cost difference between the previous candidate at a particular rank and the refined motion information and may compare the cost difference to a preset threshold. If a particular ranking is the highest priority, the cost difference between the highest priority candidate and the refined motion information may be calculated. If the calculated cost difference is greater than or equal to the threshold, the video encoding device places the refined motion information at the particular rank. On the other hand, if the calculated cost difference is less than the threshold, the video encoding device determines that the refined motion information is redundant with the leading candidate and repeats the above process for the next candidate to the particular ranking.

Here, the threshold may be set based on a quantization parameter. For example, the threshold may be set as a Lagrange parameter used for rate-distortion optimization.

Further, for pruning the merging candidate list, the video encoding device may replace or delete the existing motion information in the list with the refined motion information. At this time, the replacement or deletion may be selected by calculating a cost difference between the refined motion information and the existing motion information. Here, the cost represents the TM cost.

The replacement is replacing the existing motion information in the list with the refined motion information if the refined motion information is better in terms of cost than the existing motion information. The deletion is not adding refined motion information to the list if the refined motion information is not cost-effective compared to the existing motion information. Alternatively, the deletion means that, for a list of candidates that includes the refined motion information, the best candidates in terms of TM cost are retained and the rest of the candidates are removed, leaving the best candidates in terms of TM cost by the size of the list. In this case, the TM cost may be calculated after assuming deltaMV to be zero for the existing motion information.

Alternatively, for reordering the list, the video encoding device may reorder the motion vector candidates in the merging candidate list based on the TM cost. For example, the candidates may be prioritized by sorting the candidates in ascending order based on the TM cost.

<Example 3> Modifying a Candidate List in BM AMVP-MERGE Mode

The following describes a method of adding motion vector candidates and reordering the candidate list in BM AMVP-MERGE mode.

The motion vectors in the L0 direction and the L1 direction according to the BM AMVP-MERGE mode are designated as MV0 passN and MV1_passN, respectively. Also, MV0_passN and MV1_passN are the refined motion vectors generated according to one of the multiple passes of the MBM.

The video encoding device uses MV0_passN and MV1_passN to replace MV0 and MV1 in the existing AMVP/merge candidates. For example, with HMVP candidates, the replaced motion vectors may be used to predict motion vectors for future blocks beyond the current block.

The video encoding device adds MV0_passN and MV1_passN to MV0 and MV1 of the existing AMVP/merge candidates. For example, with HMVP candidates, the added motion vectors may be used to predict motion vectors for future blocks beyond the current block.

After the replacement or addition, the video encoding device may reorder the ranking of the candidates in the list. For example, the video encoding device may rank MV0_passN and MV1_passN highest. Alternatively, the candidates may be adaptively ranked based on BM, MBM, or TM.

The video encoding device may store the MV0_passN and MV1_passN in the HMVP for use. The video encoding device may store MV0_passN and MV1_passN separately, in addition to storing MV0_passN and MV1_passN in the existing HMVP, for use in predicting the motion vector of the next block.

The video encoding device may use MV0_passN and MV1_passN as candidate motion vectors for prediction in the L0 and L1 directions, respectively but may also use MV0_passN and MV1_passN as candidate motion vectors for prediction in reverse in the L1 and L0 directions. In this case, the signs of the candidate motion vectors may be reversed. For example, −MV0_passN may be used for L1 direction, and −MV1_passN may be used for L0 direction. This may be applied in any of the above cases.

MV0 passN and MV1_passN may be refined motion vectors from the original candidate motion vectors MV0 and MV1 in the L0 and L1 directions, but MV0_passN may be the same value as MV0, or MV1_passN may be the same value as MV1. These values may be applied in any of the foregoing cases.

The video encoding device may utilize additional flags at the prediction unit (PU) level to determine whether to use any of the foregoing embodiments.

Hereinafter, with reference to FIGS. 18 and 19, methods are described for the video encoding device or the video decoding device to inter-predict a current block based on multiple passes of the MBM and the cost of the MBM.

Figure 18:
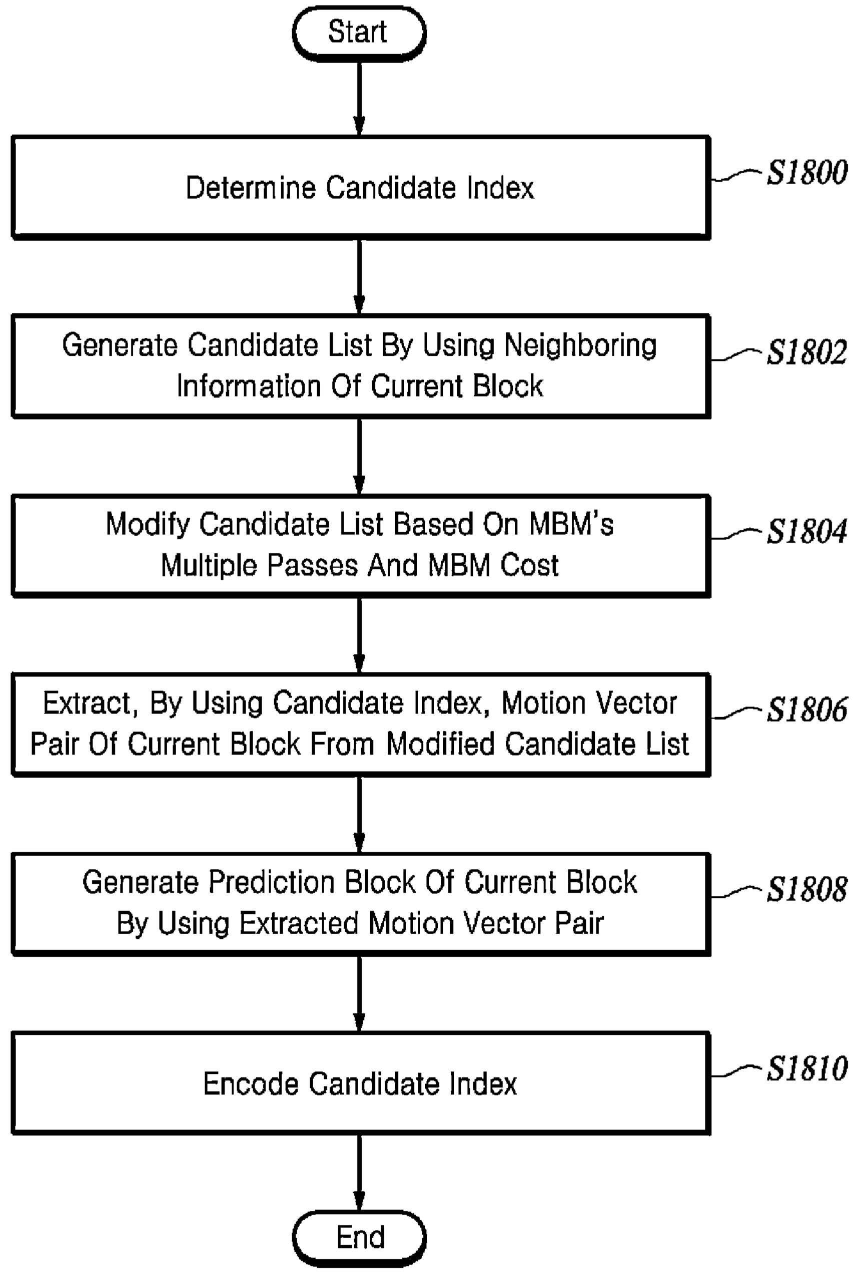
FIG. 18 is a flowchart of a method performed by a video encoding device for inter-predicting the current block, according to at least one embodiment of the present disclosure.

FIG. 18 is a flowchart of a method performed by the video encoding device for inter-predicting the current block, according to at least one embodiment of the present disclosure.

The video encoding device determines a candidate index (S1800). Here, the candidate index indicates one of a plurality of candidates in a candidate list, and each candidate represents a motion vector pair in the bi-prediction.

In merge mode, the candidate list may be a regular merging candidate list, a GPM candidate list, or an affine merging candidate list. If in AMVP mode, the candidate list may be a regular AMVP candidate list or an affine AMVP candidate list.

The video encoding device generates the candidate list by using neighboring information of the current block (S1802).

The video encoding device modifies the candidate list based on multiple passes of the MBM and the cost of the MBM (S1804). Here, the first of the multiple passes searches motion vector pairs based on the MBM cost against the current block, the second pass searches motion vector pairs based on the MBM cost against a subblock within the current block, and the third pass searches motion vector pairs based on the MBM cost against a sub-sub-block. The MBM cost depends on the difference between the two blocks indicated by the motion vector pair searched for each pass.

The video encoding device generates, by using multiple passes, a refined motion vector pair that minimizes the MBM cost for each candidate. The video encoding device may add the generated refined motion vector pairs to the candidate list. The video encoding device may calculate the difference in MBM cost between the refined motion vector pair and the corresponding candidate and may perform a replacement or deletion as described above. Alternatively, the video encoding device may reorder the candidates in the candidate list in ascending order based on MBM cost.

The video encoding device extracts a motion vector pair of the current block from the modified candidate list by using the candidate index (S1806).

The video encoding device generates a prediction block of the current block by using the extracted motion vector pairs (S1808).

The video encoding device encodes the candidate index (S1810).

Figure 19:
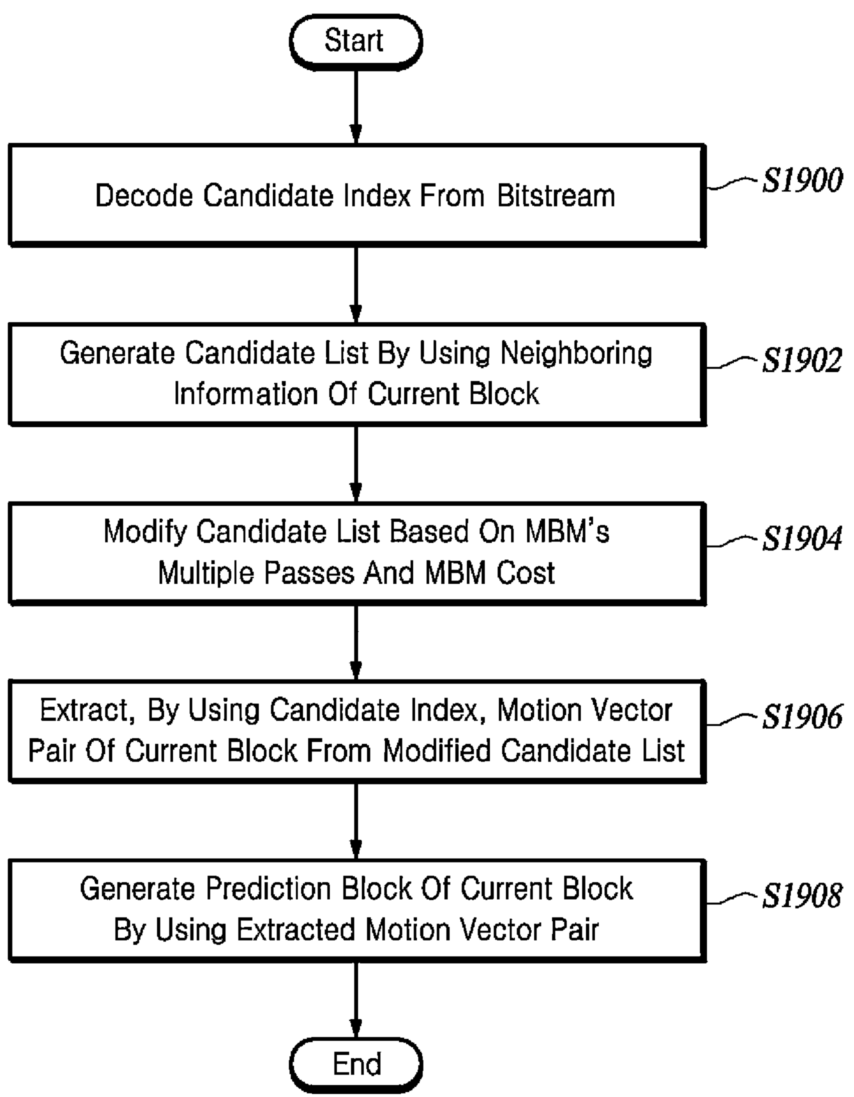
FIG. 19 is a flowchart of a method performed by a video decoding device for inter-predicting the current block, according to at least one embodiment of the present disclosure.

FIG. 19 is a flowchart of a method performed by the video decoding device for inter-predicting the current block, according to at least one embodiment of the present disclosure.

The video decoding device decodes a candidate index from the bitstream (S1900). Here, the candidate index indicates one of a plurality of candidates in a candidate list, and each candidate represents a motion vector pair in the bi-prediction.

In merge mode, the candidate list may be a regular merging candidate list, a GPM candidate list, or an affine merging candidate list. If AMVP mode, the candidate list may be a regular AMVP candidate list or an affine AMVP candidate list.

The video decoding device generates the candidate list by using neighboring information of the current block (S1902).

The video decoding device modifies the candidate list based on multiple passes of the MBM and the cost of the MBM (S1904). Here, the first of the multiple passes searches motion vector pairs based on the MBM cost against the current block, the second pass searches motion vector pairs based on the MBM cost against a subblock within the current block, and the third pass searches motion vector pairs based on the MBM cost against a sub-sub-block. The MBM cost depends on the difference between the two blocks indicated by the motion vector pair searched for each pass.

The video decoding device generates, by using multiple passes, a refined motion vector pair that minimizes the MBM cost for each candidate. The video decoding device may add the generated refined motion vector pairs to a candidate list. The video decoding device may calculate the difference in MBM cost between the refined motion vector pair and the corresponding candidate and may perform a replacement or deletion as described above. Alternatively, the video decoding device may reorder the candidates in the candidate list in ascending order based on MBM cost.

The video decoding device extracts a motion vector pair of the current block from the modified candidate list by using the candidate index (S1906).

The video decoding device generates a prediction block of the current block by using the extracted motion vector pair (S1908).

Hereinafter, with reference to FIGS. 20 and 21, methods are described for inter-predicting the current block by the video encoding device and the video decoding device based on TM and TM cost.

Figure 20:
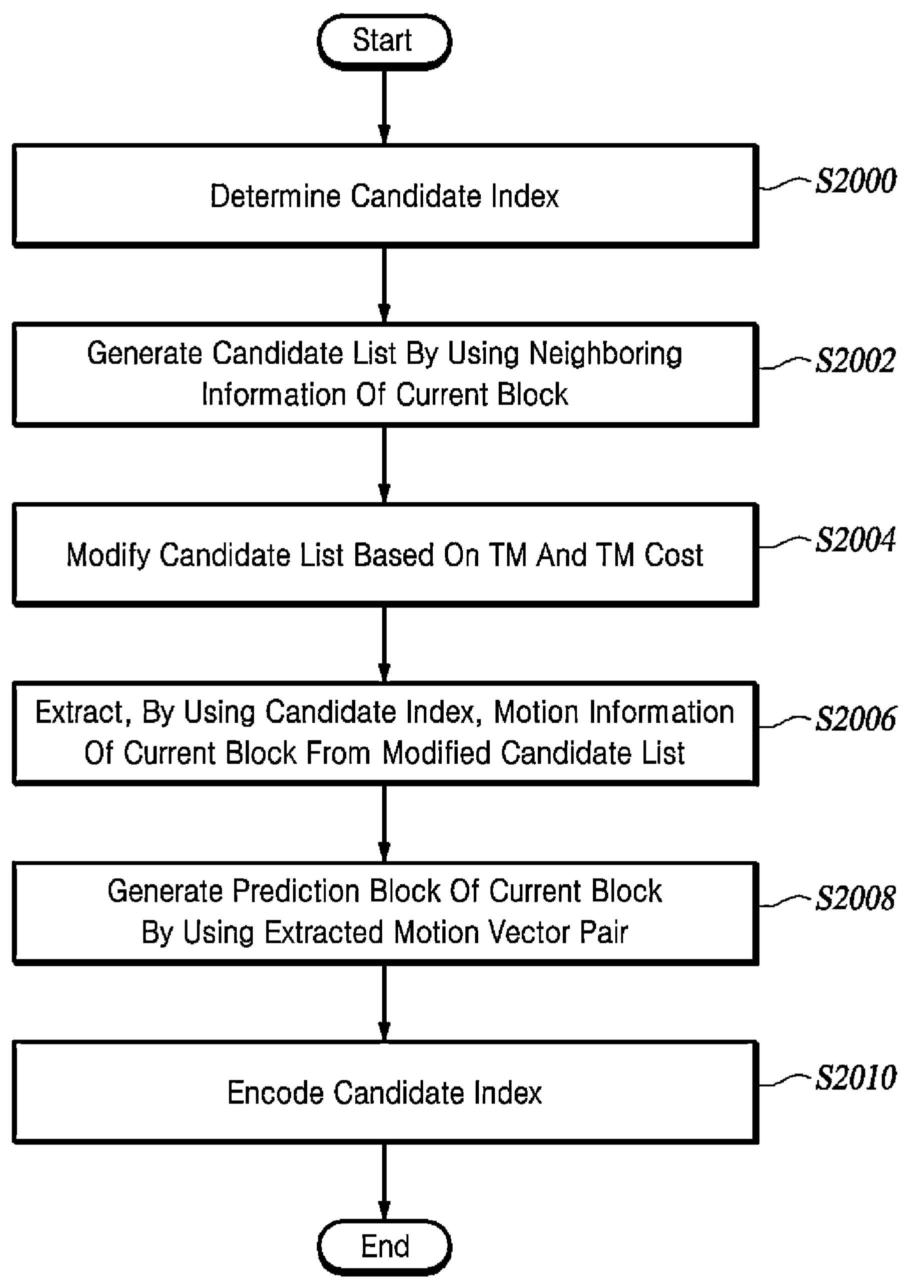
FIG. 20 is a flowchart of a method performed by the video encoding device for inter-predicting the current block, according to another embodiment of the present disclosure.

FIG. 20 is a flowchart of a method performed by the video encoding device for inter-predicting the current block, according to another embodiment of the present disclosure.

The video encoding device determines a candidate index (S2000). Here, the candidate index indicates one of a plurality of candidates in a candidate list, each candidate including, as motion information, a motion vector pair in bi-prediction or a motion vector in uni-prediction.

In merge mode, the candidate list may be a regular merging candidate list, a GPM candidate list, a TM merging candidate list, or an affine merging candidate list. When in AMVP mode, the candidate list may be a regular AMVP candidate list, a TM AMVP candidate list, or an affine AMVP candidate list.

The video encoding device generates the candidate list by using neighboring information of the current block (S2002).

The video encoding device modifies the candidate list based on the TM and TM cost (S2004). Here, TM searches for a similar template corresponding to the template of the current block in the already reconstructed region. The TM cost depends on the difference between the samples in the current block's template and the samples in the similar template.

The video encoding device may reorder the candidates in the candidate list in ascending order based on the TM cost.

In a regular merging candidate list, the video encoding device may use TM to generate, for each candidate, refined motion information that minimizes the TM cost. The video encoding device may add the generated refined motion information to the candidate list. The video encoding device may calculate the TM cost difference between the refined motion information and the corresponding candidate and may perform the replacement or deletion as described above.

The video encoding device extracts the motion information of the current block from the modified candidate list by using the candidate index (S2006).

The video encoding device generates a prediction block of the current block by using the extracted motion information (S2008).

The video encoding device encodes the candidate index (S2010).

Figure 21:
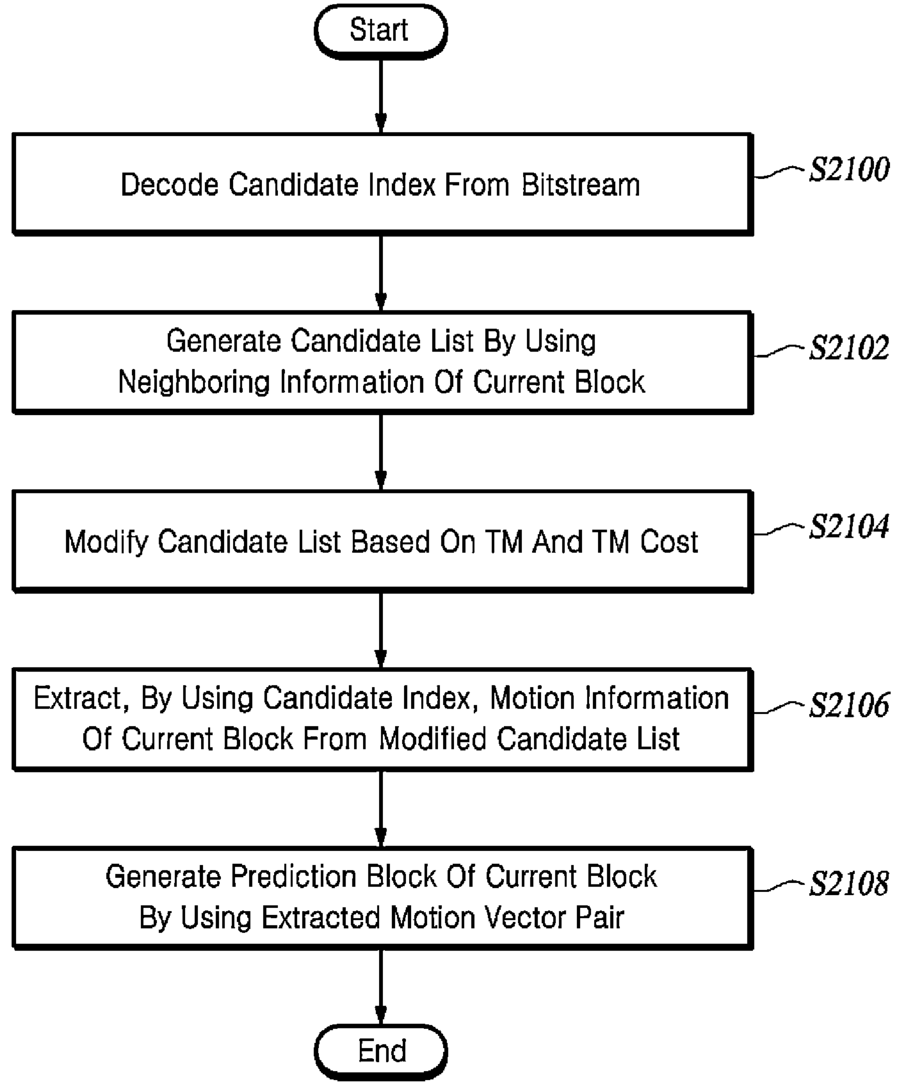
FIG. 21 is a flowchart of a method performed by the video decoding device for inter-predicting the current block, according to another embodiment of the present disclosure.

FIG. 21 is a flowchart of a method performed by the video decoding device for inter-predicting the current block, according to another embodiment of the present disclosure.

The video decoding device decodes a candidate index from the bitstream (S2100). Here, the candidate index indicates one of a plurality of candidates in a candidate list, and each candidate includes motion information, such as a motion vector pair in a bi-prediction or a motion vector in a uni-prediction.

In merge mode, the candidate list may be a regular merging candidate list, a GPM candidate list, a TM merging candidate list, or an affine merging candidate list. When in AMVP mode, the candidate list may be a regular AMVP candidate list, a TM AMVP candidate list, or an affine AMVP candidate list.

The video decoding device generates the candidate list by using neighboring information of the current block (S2102).

The video decoding device modifies the candidate list based on the TM and TM cost (S2104). Here, TM searches for a similar template corresponding to the template of the current block in the already reconstructed region. The TM cost depends on the difference between the samples in the current block's template and the samples in the similar template.

The video decoding device may reorder the candidates in the candidate list in ascending order based on the TM cost.

In the regular merging candidate list, the video decoding device may use TM to generate, for each candidate, refined motion information that minimizes TM cost. The video decoding device may add the generated refined motion information to the candidate list. The video decoding device may calculate a TM cost difference between the refined motion information and the corresponding candidate and may perform a replacement or deletion as described above.

The video decoding device extracts the motion information of the current block from the modified candidate list by using the candidate index (S2106).

The video decoding device generates a prediction block of the current block by using the extracted motion information (S2108).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

124: inter predictor
155: entropy encoder
510: entropy decoder
544: inter predictor

What is claimed is:

1. A method performed by a video decoding device for inter-predicting a current block, the method comprising:

decoding from a bitstream a candidate index that indicates one of multiple candidates in a candidate list, each candidate representing a motion vector pair in a bi-prediction;

generating the candidate list by using neighboring information of the current block;

modifying the candidate list based on multiple passes of multi-pass bilateral matching (MBM) and a cost value;

extracting a motion vector pair of the current block from the modified candidate list by using the candidate index; and generating a prediction block of the current block by using the extracted motion vector pair, wherein modifying the candidate list includes refining motion vectors of the candidates and reordering the candidates in the candidate list.

2. The method of claim 1, wherein modifying the candidate list includes:

using the multiple passes to generate, for each of the candidates, a refined motion vector pair that minimizes the cost value.

3. The method of claim 2, wherein modifying the candidate list includes:

adding the refined motion vector pair to a fixed location in the candidate list.

4. The method of claim 2, wherein modifying the candidate list includes:

performing a replacement or performing a removal by calculating a cost value difference between the refined motion vector pair and a counterpart candidate.

5. The method of claim 4, wherein performing the replacement includes:

when the refined motion vector pair is better in terms of the cost value than the counterpart candidate, replacing the counterpart candidate in the candidate list with the refined motion vector pair.

6. The method of claim 4, wherein performing the removal includes:

with the candidate list to which refined motion vector pairs of the candidates are added, retaining best candidates in terms of the cost value as many as a size of the candidate list, and removing excess candidates.

7. The method of claim 2, wherein modifying the candidate list includes:

when the candidate list is a regular merging candidate list, adding the refined motion vector pair to a particular ranking of the candidate list by taking into account a preset condition.

8. The method of claim 7, wherein modifying the candidate list includes:

calculating a cost value difference between a candidate before the particular ranking and the refined motion vector pair;

when the cost value difference is greater than or equal to a preset threshold, placing the refined motion vector pair in the particular ranking; and when the cost value difference is less than the preset threshold, retaking into account the preset condition for a ranking posterior to the particular ranking.

9. The method of claim 2, wherein modifying the candidate list includes:

when the candidate list is a regular merging candidate list, adding refined motion vector pairs to a history-based motion vector predictor (HMVP) table.

10. The method of claim 2, wherein the multiple passes include:

a first pass performing a search for a motion vector pair for the current block;

a second pass performing a search for a motion vector pair for a subblock within the current block; and a third pass performing a search for a motion vector pair for a sub-sub-block of the subblock, wherein the search is performed based on the cost value that is dependent on a difference between two blocks indicated by the searched motion vector pair for each of the multiple passes.

11. The method of claim 10, wherein modifying the candidate list includes:

using the first pass or the second pass when the candidate list is a regular merging candidate list to generate the refined motion vector pair; and using the third pass in addition to the first pass or the second pass when the candidate list is a subblock-based candidate list to generate the refined motion vector pair.

12. The method of claim 10, wherein when the candidate list is an affine merging candidate list, modifying the candidate list includes:

extracting a motion vector pair of the current block from the candidate list by using the candidate index;

corresponsive to the motion vector pair of the current block, generating a refined motion vector pair that minimizes the cost value by using the first pass, wherein the refined motion vector pair comprises the motion vector pair of the current block and a refinement value;

selecting control point motion vectors from neighboring blocks of the current block; and adding the refinement value to the control point motion vectors.

13. The method of claim 1, wherein modifying the candidate list includes:

reordering the candidates in the candidate list in ascending order based on the cost value.

14. The method of claim 1, wherein modifying the candidate list includes:

when the candidate list is a regular merging candidate list, reordering motion vector pairs in a history-based motion vector predictor (HMVP) table based on the cost value.

15. The method of claim 1, wherein modifying the candidate list includes:

when the candidate list is a geometric partitioning mode candidate list, composing the candidate list by prioritizing motion information in a regular merging candidate list based on the cost value.

16. The method of claim 1, wherein modifying the candidate list includes:

when the candidate list is an affine merging candidate list, determining a constructed affine candidate, wherein available motion vectors of neighboring blocks of the current block are reordered based on the cost value; and determining control point motion vectors that compose the constructed affine candidate in order of priority.

17. A method performed by a video decoding device for inter-predicting a current block, the method comprising:

generating a candidate list by using neighboring information of the current block;

determining a candidate index that indicates one of multiple candidates in the candidate list, each candidate representing a motion vector pair in a bi-prediction;

modifying the candidate list based on multiple passes of multi-pass bilateral matching (MBM) and a cost value;

extracting a motion vector pair of the current block from the modified candidate list by using the candidate index;

generating a prediction block of the current block by using the extracted motion vector pair; and encoding the candidate index, wherein modifying the candidate list includes refining motion vectors of the candidates and reordering the candidates in the candidate list.

18. A method for transmitting a bitstream, the method comprising:

encoding the video data into a bitstream; and transmitting the bitstream to the video decoding apparatus, wherein encoding the video data comprises:

generating a candidate list by using neighboring information of a current block;

determining a candidate index that indicates one of multiple candidates in the candidate list, each candidate representing a motion vector pair in a bi-prediction;

modifying the candidate list based on multiple passes of multi-pass bilateral matching (MBM) and a cost value;

extracting a motion vector pair of the current block from the modified candidate list by using the candidate index;

generating a prediction block of the current block by using the extracted motion vector pair; and encoding the candidate index, and wherein modifying the candidate list includes refining motion vectors of the candidates and reordering the candidates in the candidate list.

* * * * *